United States Patent
Shah et al.

(10) Patent No.: US 11,796,637 B1
(45) Date of Patent: Oct. 24, 2023

(54) FALL DETECTION ON UNEVEN SURFACES USING RADAR

(71) Applicant: Amazon Technologies, Inc., Seattle, WA (US)

(72) Inventors: Kandarp Shah, San Jose, CA (US); Jayashree Subramanian, Sunnyvale, CA (US); Pratik Kalpesh Patel, San Jose, CA (US); Srinath Byregowda, Sunnyvale, CA (US); James J Wolfe, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 508 days.

(21) Appl. No.: 17/016,746

(22) Filed: Sep. 10, 2020

(51) Int. Cl.
| | |
|---|---|
| *G01S 7/41* | (2006.01) |
| *G01S 13/42* | (2006.01) |
| *G06T 7/246* | (2017.01) |
| *G06T 7/60* | (2017.01) |

(52) U.S. Cl.
CPC ............ *G01S 7/415* (2013.01); *G01S 7/412* (2013.01); *G01S 13/42* (2013.01); *G06T 7/246* (2017.01); *G06T 7/60* (2013.01); *G06T 2207/10028* (2013.01); *G06T 2207/10044* (2013.01); *G06T 2207/20081* (2013.01); *G06T 2207/30196* (2013.01)

(58) Field of Classification Search
CPC .......... G01S 7/415; G01S 7/412; G01S 13/42; G06T 7/246; G06T 7/60; G06T 2207/10028; G06T 2207/10044; G06T 2207/20081; G06T 2207/30196
See application file for complete search history.

(56) References Cited

U.S. PATENT DOCUMENTS

| | | | |
|---|---|---|---|
| 2007/0257910 A1* | 11/2007 | Gutmann | G06V 20/10 |
| | | | 700/262 |
| 2013/0002434 A1* | 1/2013 | Cuddihy | G01S 13/18 |
| | | | 342/28 |
| 2020/0329358 A1 | 10/2020 | Hamre et al. | |
| 2022/0122722 A1* | 4/2022 | Wang | G06F 18/214 |
| 2022/0331028 A1* | 10/2022 | Sternitzke | A61B 5/1176 |

FOREIGN PATENT DOCUMENTS

WO WO2022/0331028 * 12/2020 ............ G01S 13/24

OTHER PUBLICATIONS

Texas Instruments: ISR6843 Single Chip 60-64 GHz mmWave Sensor Data Sheet (Year: 2018).*

* cited by examiner

*Primary Examiner* — Donald HB Braswell
(74) *Attorney, Agent, or Firm* — Lee & Hayes, P.C.

(57) ABSTRACT

Systems and methods for fall detection on uneven surfaces utilizing radar are disclosed. For example, an electronic device may receive reflected energy from surfaces in an environment. Corresponding sensor data associated with an object moving on an uneven surface may be utilized to determine a velocity of the object and a height change of the object. When the velocity indicates that the object has stopped moving toward or away from the sensing device, and the height values indicate a sudden decrease in height, a fall event may be detected.

20 Claims, 10 Drawing Sheets

900

Determine, by device over period of time, first set of values representing velocity of object moving on surface and in direction toward or away from device, surface having gradient
902

Determine, by device over period of time, second set of values representing height of object as perceived by device
904

Determine, by device and at first time during period of time, that first value, of first set of values, is equal to or less than at least first threshold value indicative of object ceasing movement
906

Determine, by device and at first time, that second value, of second set of values, is less than second threshold value corresponding to expected height of object at location at first time
908

Determine that first event has occurred in association with object
910

FIG. 9

FALL DETECTION ON UNEVEN SURFACES USING RADAR

BACKGROUND

Electronic devices are now common in many environments such as homes and offices. Some electronic devices may be utilized to detect events that occur in such environments. Detection of events in various environments with different characteristics may be useful. Described herein are improvements in technology and solutions to technical problems that can be used to, among other things, detect environmental events.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of another example process for fall detection on uneven surfaces utilizing radar.

DETAILED DESCRIPTION

Figure 1:
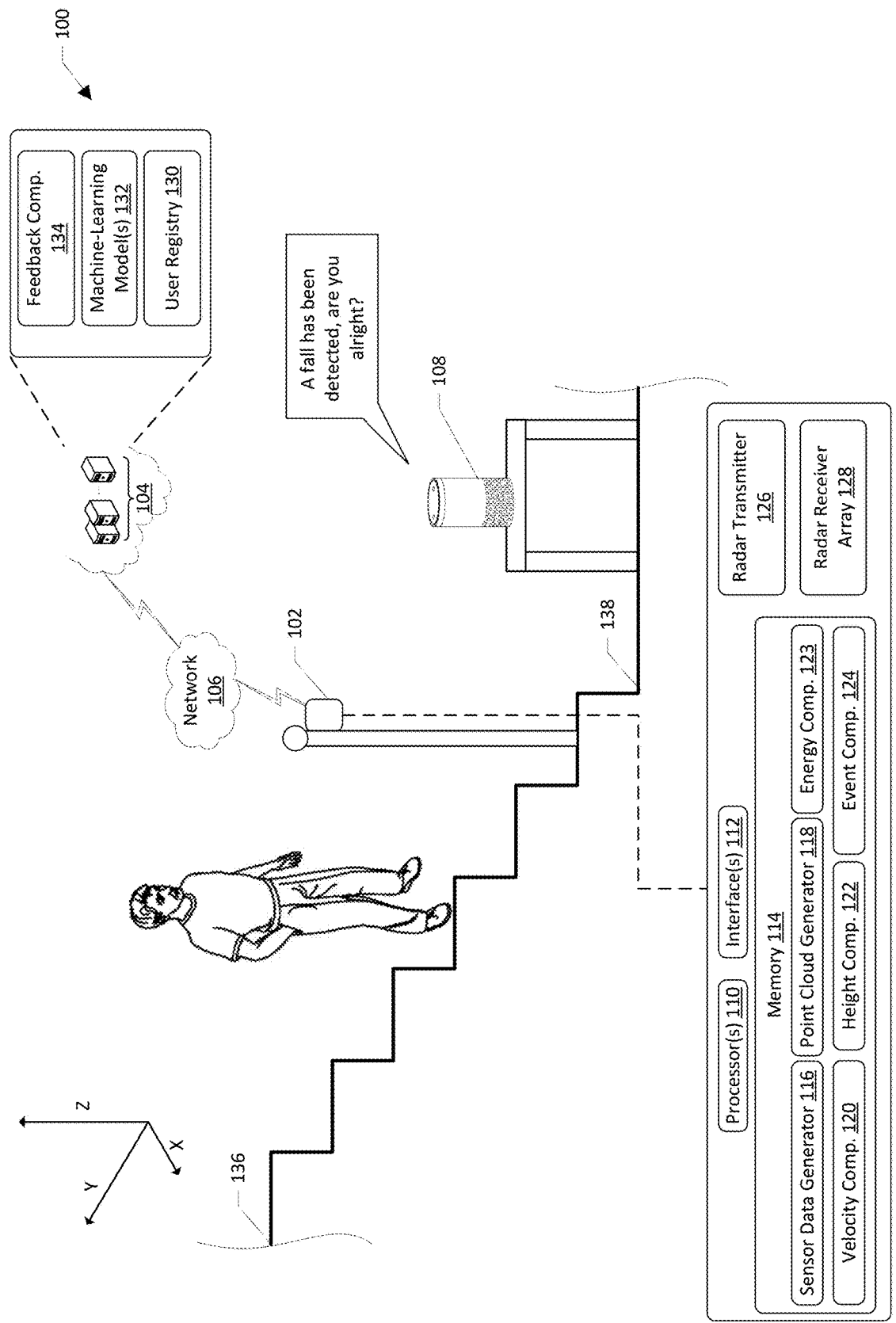
FIG. 1 illustrates a schematic diagram of an example environment for fall detection on uneven surfaces utilizing radar.

Systems and methods for fall detection on uneven surfaces using radar are disclosed. Take, for example, an environment such as a room where one or more objects, such as furniture, and one or more subjects, such as users, may be disposed within the room. In some environments, the floor portions of the environment may be uneven, such as situations where the environment includes stairs, a ramp, a sunken portion such as a sunken living room, a step-up and/or step-down between rooms, etc. In these situations, determining whether a fall event has occurred may not be feasible by simply determining a height change of an object in the environment at least because the height of the object will naturally change as the object traverses the uneven surface. As such, it may be advantageous to determine if a fall event has occurred on these uneven surfaces utilizing radar. To determine whether a fall event has occurred on an uneven surface in an environment, particularly with a degree of accuracy sufficient to perform an action such as outputting a notification and/or establishing a communication channel with the person that has fallen, radar-based techniques may be performed. For example, an electronic device having radar functionality may be disposed in the room in question, such as on a portion of the uneven surface and/or near the uneven surface. In an example, the electronic device may be positioned on or near a top step and/or a bottom step of a staircase. The electronic devices may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a room of a home as described by way of example throughout this disclosure, in a place of business, healthcare facility (e.g., hospital, doctor's office, pharmacy, etc.), in a public forum (e.g., shopping center, store, etc.), etc.

The electronic device may include a radar transmitter and a radar receiver array. The radar transmitter may be configured to produce and emit electromagnetic waves in the radio or microwave domain. One or more transmitting antennas of the electronic device may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device may include the radar receiver array, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A sensor data generator of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

Utilizing the sensor data, points corresponding to portions of objects in the environment may be determined. In addition, the intensity of the energy received back at the electronic device may be determined. These points may indicate Cartesian coordinates for points corresponding to surfaces in the environment and energy intensity associated with some or each of those points. In examples, the points may represent an averaging of locations associated with reflected energy and intensity of the reflected energy over a period of time. A point cloud generator may be configured to generate a point cloud representing rates of energy intensity change associated with the environment. For example, a given coordinate of the points may be associated with a first energy intensity and an adjoining or other associated coordinate may be associated with a second energy intensity. In examples where there is a large rate of change of those intensities, the rate of change may indicate the presence of a surface and/or object. In examples where there is a small rate of change, an object may not be present and/or a small object may be present instead of a large object. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator may also be configured to determine one or more sectors of the point cloud. For example, groupings and/or clusters of points in a given area may be determined to be a sector. The sectors may also include an amount of space outside the grouping of points.

A velocity component may be configured to utilize the data representing the point cloud to determine a velocity of a given object in the environment, such as in multiple directions. For example, the velocity component may be configured to determine a velocity of a given object on the uneven surface in a first direction, also described herein as the Y direction, which may be a direction that is substantially toward and away from the device that transmits and/or receives the energy from the environment. In this example, the Y direction indicates a velocity at which the object is travelling up or down the stairs given the location of the device as being positioned, for example, at the top or the bottom of the stairs. In these examples, a person may traverse the stairs typically at a fairly constant velocity, for example at 1 meter per second. Subtle variations in the velocity may also be typical, such as when certain pauses or decreases in velocity occur as each step is taken when the person is climbing up the stairs. Also, typically a person will travel down the stairs at a slightly faster velocity than climbing up the stairs. However, when a person is climbing up the stairs, a fall event may occur when the velocity goes from a steady rate and then decreases suddenly, such as to 0. While this may indicate a fall event, it may also simply indicate that the person has purposefully stopped climbing the stairs. As such, additional signals may be utilized to determine if this sudden drop in velocity is attributable to a fall event. When a person is traveling down the stairs, a fall event may occur when the velocity goes from a first steady rate, increases suddenly and/or changes frequently over a period of time, and then decreases to 0 or near 0. In these examples, a person traveling down the stairs may have fallen down at least a portion of the stairs, attributable to the increased velocity, and then landed at the bottom of the stairs, attributable to the 0 or near 0 velocity. Still, this velocity change may be attributable to, instead of a fall event, a person simply deciding to travel more quickly down the stairs and then stopping at the bottom of the stairs purposefully. As such, additional signals may be utilized to determine if this velocity pattern is attributable to a fall event. By way of additional example, a fall event may occur on a portion of stairs that is between where the stairs start and end, or in other words the fall may occur anywhere between the start and end of the stairs. The devices and techniques described herein may be utilized to detect such fall events. For example, a person may start traveling down the stairs and fall but not fall down to the bottom of the stairs, in this example, the velocity of the person toward or away from the device may decrease to near zero and the height value change may indicate that the person is no longer standing. In this example, the perceived height of the person may still be several meters depending on where the person fell on the stairs, but the change in height at or around the time when the velocity value decreased may indicate that a fall even occurred. When energy distribution values are also utilized, the change in energy distribution at or around the time when the velocity value decreased may also be utilized as a signal to determine if the fall even occurred.

In addition to velocity in the Y direction, the velocity component may also determine velocity of the object in other directions, such as a second direction, also described herein as the X direction, indicating side to side motion or otherwise a lateral motion of a person on the uneven surface. For example, when a person traverses stairs, that person may typically be positioned on a side of the stairs where a handrail is present and may stay substantially on that side of the stairs during the duration of the travel on the stairs. However, when a fall event occurs, the side to side motion of the person may differ, sometimes substantially, from how the side to side movement of the person would be absent a fall event. For example, when the velocity of the person in the X direction indicates a first minimal X direction velocity and then a sudden increase in velocity in either one direction or back and forth, such as signal may indicate that the person has fallen at least partially sideways on the stairs. By way of further example, a rate of change of the perceived height of the person, also described herein as a rate of change in the Z direction, may be determined. In these examples, when a person traverses an uneven surface without incident, it is expected that the height will steadily or substantially steadily increase when the person is climbing up the uneven surface or decrease when the person is traveling down the uneven surface. However, when a fall event occurs, the height change may increase suddenly, indicating that the person is no longer in a standing position. Some or all of these velocities and/or rates of perceived height change may be determined and utilized by an event component to determine if a fall event has occurred on the uneven surface of the environment. The velocity component may determine the rates-of-change of the position of the object over time utilizing, for example, the data representing the point cloud of the object as generated by the point cloud generator. In examples, a centroid of the point cloud may be determined and may be utilized as a reference position of the object over time to determine positional changes of the object.

In examples, the velocity component may compare the velocity of the object in the one or more directions to one or more threshold velocities to determine if a determined velocity is problematic. When one or more of the velocities satisfy one or more of the threshold velocities, the velocity component may send data to an event component indicating as much, and in examples, the data representing the velocity of the object during the subject time may also be sent.

A height component may be configured to determine a height of an object over time. For example, the sensor data and/or the data representing the point cloud of the object may indicate a point of the object that has is at a maximum in the Z direction, or otherwise a top-most point of the object, also described herein as zMax. This point may represent a height of the object in the environment. The height component may determine the height of the object over time in the environment, particularly when the object traverses the uneven surface. When a person traverses the uneven surface without incident, it is expected that the height of the person will increase steadily as the person climbs the uneven surface and decrease steadily as the person travels down the uneven surface. However, when a fall event occurs, the height of the person may decrease suddenly, indicating that either the person has purposefully laid down on or near the uneven surface or the person has fallen. The height component may be configured to compare the height values of the object with threshold height values to determine if a given height value or set of height values is potentially problematic and indicative of a fall event. In these examples, when the height component determines that the height value satisfies the threshold height value, the height component may send data to the event component indicating as much, and in examples, the data representing the height of the object during the subject time may also be sent. Additionally, in examples, a change in height value may be determined and utilized to determine if a fall event has occurred. For example, when a measured velocity of the object reaches the threshold velocity value as described herein, the change in height value of the object as perceived by the radar device may be analyzed to determine if the height value changed more than anticipated, such as more than a threshold height value change, which may indicate that a fall has occurred. In examples, the threshold height value change may be static and may not be based at least in part on the height of the specific person that is traversing the stairs. In other examples, the threshold height value change may be dynamic and may be based at least in part on the height of the specific person traversing the stairs.

The event component may be configured to utilize the indications from the velocity component and/or the height component and/or the data indicating the object velocity and height to determine if a fall event has occurred. For example, when the event component determines that the velocity satisfies the threshold velocity and the height value change satisfies the threshold height value change at or near the same time, the event component may determine that a fall event is likely to have occurred and may, in examples, determine a confidence value associated with the fall event determination. In other examples, the event component may perform the comparison of the sample values with the thresholds as described herein. It should be understood that while threshold comparisons are utilized as an example for determining if a fall event has occurred, this disclosure includes other methodologies for determining whether given sample values indicate that a fall has occurred, such as determining a score associated with given values. When the event component determines that a fall event has occurred, one or more actions may be performed, such as causing a voice interface device to output audio into the environment requesting user input confirming or denying that the event occurred and/or establishing a communication channel with another device, such as a device associated with emergency services and/or an emergency contact. Other actions are also included in this disclosure, such as sending notifications to one or more devices, sounding an alarm, dispatching emergency services, gathering additional information about the environment, etc.

In some examples, data associated with the fall event may be sent to a remote system, such as a remote system associated with the electronic device. The remote system may include one or more components, such as a component that includes machine-learning models and/or a feedback component. The data indicating that an event has been detected as well as the data associated with the event may be utilized to train the machine-learning models to improve the accuracy of subsequent fall detection, such as for the environment in question and/or other environments universally. In these examples, the event-related data may be input as a training dataset to the models and the models may output data indicating what the one or more thresholds should be. Data indicating the thresholds may be sent from the remote system to the electronic device(s), which may utilize that data to set the thresholds for event detection. The feedback component may be configured to utilize, for example, user input data indicating whether given detected fall events were in fact associated with a fall event. This feedback data may be utilized in the same or a similar manner for modifying the one or more thresholds described herein. Additional details on the use of machine-learning models is provided below.

Additionally, or alternatively, energy distribution information associated with the object in question may be utilized to determine whether a fall event has occurred. For example, when the energy reflected off the object is received at the electronic device, the quantity of energy associated with particular coordinates in the environment may be useful for determining whether a fall even has occurred. To illustrate, when a person is standing in an environment, the energy reflected off that person may be generally distributed evenly throughout the shape of the person. In other words, energy may be distributed in the Z direction from the top of the standing person's head to the bottom of the person's feet, with a small amount of the energy distributed at the bottom or feet portion of the person. However, when a person falls to the floor, the energy reflected off the person may be concentrated near a floor portion of the environment and may be more intense than when the person is standing because the surface area of the person may have decreased from the point of view of the electronic device. For example, a 60 GHz millimeter wave MIMO radar may be capable of resolving the energy being reflected back from an object into a three-dimensional grid. The unit of such a grid may be dependent on the bandwidth and the number of antennas in the array. The higher the bandwidth and the higher the number of antennas, the finer the grid spacing and the more accurate the three-dimensional energy profile of the target will be. The ratio of the energy in different grid blocks may be used to detect a fall. In examples, an uneven surface may be at an angle with respect to the absolute location of the energy. In these examples, the energy grid blocks may not be used, however the ratio of energy is independent of this angle and hence may provide a more accurate representation of the pose of the object. It should be appreciated that the radar device as described herein may be a device that is at least temporarily affixed to a portion of the environment, such as to a staircase, and is not an object that a person wears on the person's body.

Also, in examples, a user registry of the remote system may store user account data associated with the electronic device at issue, the environment, and/or one or more attributes of objects in the environment. This information may be utilized by the electronic device to determine whether a fall event has occurred and/or to whom the fall event should be attributed. For example, the user account data may indicate a position of the electronic device as placed by a user in the environment. In these examples, placement of the electronic device at a bottom portion of the stairs or placement of the electronic device at the top portion of the stairs may be utilized to determine what velocity and height value thresholds to utilize. For example, when the device is placed at the bottom of the stairs, it may be expected that the velocity of an object moving away from the electronic device (i.e., climbing the stairs) will be less than the velocity of the object moving toward the device (i.e., traveling down the stairs), and the height of the object is expected to decrease when the object is moving toward the device and is expected to increase when the object is moving away from the device. This may be substantially opposite when the device is positioned at a top portion of the stairs. Additionally, or alternatively, the user account data may be utilized to indicate attributes of users in the environment, such as which users are associated with given personal devices such as mobile phones, the heights of such users, user categories such as adult or child, a number of users in the environment, the ages of users, etc. In these examples, this user account data may be utilized to identify the person involved in a fall event and/or to determine what action to take in response to detecting the fall event, for example.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for fall detection on uneven surfaces utilizing radar. The system 100 may include, for example, an electronic device 102, which may include communal devices, personal devices, and/or devices configured with sensors to detect environmental changes. In certain examples, at least some of the devices 102 may be voice-enabled devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices 102 may be situated in a home, a place of business, healthcare facility (e.g., hospital, doctor's office, pharmacy, etc.), for example. The system 100 may also include one or more other devices, such as personal devices, which may be electronic devices, such as a mobile phone, tablet, laptop, wearable device, and/or other computing device that is specifically associated with a given user profile. The electronic devices 102 may be configured to send data to and/or receive data from a remote system 104, such as via a network 106. Additionally, it should be understood that a given space and/or environment may include numerous electronic devices 102 and/or personal devices. It should also be understood that when a "space" or "environment" is used herein, those terms mean an area and not necessarily a given room, building, or other structure, unless otherwise specifically described as such. The environment may also include one or more voice interface devices 108 that may be utilized to communicate with users in the environment, such as when a fall event is detected as described herein.

The electronic devices 102 may include one or more components, such as, for example, one or more processors 110, one or more network interfaces 112, memory 114, one or more radar transmitters 126, and/or a radar receiver array 128. The electronic device 102 may also have one or more components not depicted in FIG. 1, such as microphones that may be configured to capture audio, such as user utterances, and generate corresponding audio data, and speakers that may be configured to output audio, such as audio corresponding to audio data received from another device and/or the system 104. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. The radar transmitter 126 may be configured to produce and emit electromagnetic waves in the radio or microwave domain. One or more transmitting antennas of the electronic device 102 may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device 102 may include the radar receiver array 128, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the electronic device 102 may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

The memory 114 may include one or more components such as, for example, a sensor data generator 116, a point cloud generator 118, a velocity component 120, a height component 122, an energy component 123, and/or an event component 124, which will be described in more detail below. It should be understood that when voice-enabled devices are described herein, those voice-enabled devices may include phones, computers, and/or other computing devices.

The remote system 104 may include components such as, for example, a user registry 130, one or more machine-learning models 132, and/or a feedback component 134. The remote system 104 may also include one or more of the components of the electronic device 102, such as the components described herein as performing the fall event detection. It should be understood that while the components are depicted as separate from each other in FIG. 1, some or all of the components may be a part of the same system. When the remote system includes a speech-processing system, that system may include an automatic speech recognition component (ASR), a natural language understanding component (NLU), and/or a text-to-speech component (TTS). Each of the components described herein with respect to the remote system 104 may be associated with their own systems, which collectively may be referred to herein as the remote system 104, and/or some or all of the components may be associated with a single system. Additionally, the remote system 104 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to the TTS component, a link or other resource locator for audio data, and/or a command to a device, such as the device 102.

In instances where a voice-enabled device is utilized, skills may extend the functionality of devices 102 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device, and send data and/or instructions associated with the input to one or more other devices.

The components of the remote system 104 are described in detail below. In examples, some or each of the components of the remote system 104 may include their own processor(s), network interface(s), and/or memory. As such, by way of example, the speech-processing system may include and/or be associated with processor(s), network interface(s), and/or memory. The other components of the remote system 104, such as the point cloud generator 118 and/or the event component 124, may include and/or be associated with different processor(s), network interface(s), and/or memory, or one or more of these components may utilize some or all of the same processor(s), network interface(s), and/or memory utilized by the speech-processing system. These components are described in detail below. Additionally, the operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The components of the electronic device 102 and/or the remote system 104 will now be described by way of example.

For example, the radar transmitter 126 may be configured to produce and emit electromagnetic waves in the radio or microwave domain. One or more transmitting antennas of the electronic device 102 may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device 102 may include the radar receiver array 128, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). The sensor data generator 116 may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

Utilizing the sensor data, points corresponding to portions of objects in the environment may be determined. In addition, the intensity of the energy received back at the electronic device may be determined. These points may indicate Cartesian coordinates for points corresponding to surfaces in the environment and energy intensity associated with some or each of those points. In examples, the points may represent an averaging of locations associated with reflected energy and intensity of the reflected energy over a period of time. The point cloud generator 118 may be configured to generate a point cloud representing rates of energy intensity change associated with the environment. For example, a given coordinate of the points may be associated with a first energy intensity and an adjoining or other associated coordinate may be associated with a second energy intensity. In examples where there is a large rate of change of those intensities, the rate of change may indicate the presence of a surface and/or object. In examples where there is a small rate of change, an object may not be present and/or a small object may be present instead of a large object. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator 118 may also be configured to determine one or more sectors of the point cloud. For example, groupings and/or clusters of points in a given area may be determined to be a sector. The sectors may also include an amount of space outside the grouping of points.

The velocity component 120 may be configured to utilize the data representing the point cloud to determine a velocity of a given object in the environment, such as in multiple directions. For example, the velocity component 120 may be configured to determine a velocity of a given object on the uneven surface in a first direction, also described herein as the Y direction, which may be a direction that is substantially toward and away from the device that transmits and/or receives the energy from the environment. In this example, the Y direction indicates a velocity at which the object is travelling up or down the stairs given the location of the device as being positioned, for example, at the top or the bottom of the stairs. In these examples, a person may traverse the stairs typically at a fairly constant velocity, for example at 1 meter per second. Subtle variations in the velocity may also be typical, such as when certain pauses or decreases in velocity as each step is taken when the person is climb up the stairs. Also, typically a person will travel down the stairs at a slightly faster velocity than climbing up the stairs. However, when a person is climbing up the stairs, a fall event may occur when the velocity goes from a steady rate and then decreases suddenly, such as to 0. While this may indicate a fall event, it may also simply indicate that the person has purposefully stopped climbing the stairs. As such, additional signals may be utilized to determine if this sudden drop in velocity is attributable to a fall event. When a person is traveling down the stairs, a fall event may occur when the velocity goes from a first steady rate, increases suddenly and/or changes frequently over a period of time, and then decreases to 0 or near 0. In these examples, a person traveling down the stairs may have fallen down at least a portion of the stairs, attributable to the increased velocity, and then landed at the bottom of the stairs, attributable to the 0 or near 0 velocity. Still, this velocity change may be attributable to, instead of a fall event, a person simply deciding to travel more quickly down the stairs and then stop at the bottom of the stairs purposefully. As such, additional signals may be utilized to determine if this velocity pattern is attributable to a fall event.

It should be understood that while stairs are utilized here by way of example, the devices and processes described herein may be utilized to detect fall events on any uneven surface having an elevation gradient (whether that be a uniform elevation gradient or not). The elevation gradient may be between a first boundary portion of the environment in question and a second boundary portion of the environment. In the example of FIG. 1, example boundary portions are illustrated. For example, a first boundary portion 136 is illustrated as where a top stair of a staircase is situated in the environment, while a second boundary portion 138 is illustrated as where a bottom stair of the staircase is situated in the environment.

In addition to velocity in the Y direction, the velocity component 120 may also determine velocity of the object in other directions, such as a second direction, also described herein as the X direction, indicating side to side motion of a person on the uneven surface. For example, when a person traverses stairs, that person may typically be positioned on a side of the stairs where a handrail is present and may stay substantially on that side of the stairs during the duration of the travel on the stairs. However, when a fall event occurs, the side to side motion of the person may differ, sometimes substantially, from how the side to side movement of the person would be absent a fall event. For example, when the velocity of the person in the X direction indicates a first minimal X direction velocity and then a sudden increase in velocity in either one direction or back and forth, such as signal may indicate that the person has fallen at least partially sideways on the stairs. By way of further example, a rate of change of the perceived height of the person, also described herein as a rate of change in the Z direction, may be determined. In these examples, when a person traverses an uneven surface without incident, it is expected that the height will steadily or substantially steadily increase when the person is climbing up the uneven surface or decrease when the person is traveling down the uneven surface. However, when a fall event occurs, the height change may increase suddenly, indicating that the person is no longer in a standing position. Some or all of these velocities and/or rates of perceived height change may be determined and utilized by the event component 124 to determine if a fall event has occurred on the uneven surface of the environment. The velocity component 120 may determine the velocities of the object over time utilizing, for example, the data representing the point cloud of the object as generated by the point cloud generator 118. In examples, a centroid of the point cloud may be determined and may be utilized as a reference position of the object over time to determine positional changes of the object.

In examples, the velocity component 120 may compare the velocity values indicating the velocity of the object in the one or more directions to one or more threshold velocities to determine if a determined velocity is problematic. When one or more of the velocities satisfy one or more of the threshold velocities, the velocity component 120 may send data to the event component 124 indicating as much, and in examples, the data representing the velocity of the object during the subject time.

The height component 122 may be configured to determine a height of an object over time. For example, the sensor data and/or the data representing the point cloud of the object may indicate a point of the object that has is at a maximum in the Z direction, or otherwise a top-most point of the object, also described herein as zMax. This point may represent a height of the object in the environment. The height component 122 may determine the height of the object over time in the environment, particularly when the object traverses the uneven surface. When a person traverses the uneven surface without incident, it is expected that the height of the person will increase steadily as the person climbs the uneven surface and decrease steadily as the person travels down the uneven surface. However, when a fall event occurs, the height of the person may decrease suddenly, indicating that either the person has purposefully laid down on or near the uneven surface or the person has fallen. The height component 122 may be configured to compare the height values of the object with threshold height values to determine if a given height value or set of height values is potentially problematic and indicative of a fall event. In these examples, when the height component 122 determines that the height value satisfies the threshold height value, the height component 122 may send data to the event component 124 indicating as much, and in examples, the data representing the height of the object during the subject time. Additionally, in examples, a change in height value may be determined and utilized to determine if a fall event has occurred. For example, when a measured velocity of the object reaches the threshold velocity value as described herein, the change in height value of the object as perceived by the radar device may be analyzed to determine if the height value changed more than anticipated, such as more than a threshold height value change, which may indicate that a fall has occurred. In examples, the threshold height value change may be static and may not be based at least in part on the height of the specific person that is traversing the stairs. In other examples, the threshold height value change may be dynamic and may be based at least in part on the height of the specific person traversing the stairs.

The energy component 123 may be configured to determine an energy distribution of energy reflected off an object. For example, when the object is a human and the human is standing, the energy distribution of energy reflected off the human may be evenly or substantially evenly distributed from a top portion of the human to a bottom portion of the human. In the event that the human falls, the energy distribution may change such that a majority or substantially all of the reflected energy is distributed near the bottom portion of the human and/or that a high quantity of reflected energy is reflected near the bottom portion of the human. This may indicate that the human is no longer standing and is instead situated near or on the floor of the environment. The energy component 123 may send data to the event component 124 indicating this change in energy distribution, and in examples, the data representing the changed energy distribution.

The event component 124 may be configured to utilize the indications from the velocity component 120 and/or the height component 122 and/or the energy distribution component 123 and/or the data from these components to determine if a fall event has occurred. For example, when the event component 124 determines that the velocity satisfies the threshold velocity and the height value change satisfies the threshold height value change at or near the same time, the event component 124 may determine that a fall event is likely to have occurred and may, in examples, determine a confidence value associated with the fall event determination. In other examples, the event component 124 may perform the comparison of the sample values with the thresholds as described herein. It should be understood that while threshold comparisons are utilized as an example for determining if a fall event has occurred, this disclosure includes other methodologies for determining whether given sample values indicate that a fall has occurred, such as determining a score associated with given values. When the event component 124 determines that a fall event has occurred, one or more actions may be performed, such as causing a voice interface device 108 to output audio into the environment requesting user input confirming or denying that the event occurred and/or to establish a communication channel with another device, such as a device associated with emergency services and/or an emergency contact. Other actions are also included in this disclosure, such as sending notifications to one or more devices, sounding an alarm, dispatching emergency services, gathering additional information about the environment, etc.

In some examples, data associated with the fall event may be sent to the remote system 104. The data indicating that an event has been detected as well as the data associated with the event may be utilized to train the machine-learning models 132 to improve the accuracy of subsequent fall detection, such as for the environment in question and/or other environments universally. In these examples, the event-related data may be input as a training dataset to the models 132 and the models 132 may output data indicating what the one or more thresholds should be. Data indicating the thresholds may be sent from the remote system 104 to the electronic device(s) 102, which may utilize that data to set the thresholds for event detection. The feedback component 134 may be configured to utilize, for example, user input data indicating whether given detected fall events were in fact associated with a fall event. This feedback data may be utilized in the same or a similar manner for modifying the one or more thresholds described herein.

The models 132 described herein may utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models 132, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models 132. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

Additionally, or alternatively, energy distribution information associated with the object in question may be utilized to determine whether a fall event has occurred. For example, when the energy reflected off the object is received at the electronic device 102, the quantity of energy associated with particular coordinates in the environment may be useful for determining whether a fall even has occurred. To illustrate, when a person is standing in an environment, the energy reflected off that person may be generally distributed evenly throughout the shape of the person. In other words, energy may be distributed in the Z direction from the top of the standing person's head to the bottom of the person's feet, with a small amount of the energy distributed at the bottom or feet portion of the person. However, when a person falls to the floor, the energy reflected off the person may be concentrated near a floor portion of the environment and may be more intense than when the person is standing because the surface area of the person may have decreased from the point of view of the electronic device 102. For example, a 60 GHz millimeter wave MIMO radar may be capable of resolving the energy being reflected back from an object into a three-dimensional grid. The unit of this grid may be dependent on the bandwidth and the number of antennas in the array. The higher the bandwidth and the higher the number of antennas, the finer the grid spacing and the more accurate the three-dimensional energy profile of the target will be. The ratio of the energy in different grid blocks may be used to detect a fall. In examples, an uneven surface may be at an angle with respect to the absolute location of the energy. In these examples, the energy grid blocks may not be used, however the ratio of energy is independent of this angle and hence may provide a more accurate representation of the pose of the object.

Also, in examples, the user registry 130 of the remote system 104 may store user account data associated with the electronic device 102 at issue, the environment, and/or one or more attributes of objects in the environment. This information may be utilized by the electronic device to determine whether a fall event has occurred and/or to whom the fall event should be attributed. For example, the user account data may indicate a position of the electronic device 102 as placed by a user in the environment. In these examples, placement of the electronic device 102 at a bottom portion of the stairs or placement of the electronic device 102 at the top portion of the stairs may be utilized to determine what velocity and height value thresholds to utilize. For example, when the device 102 is placed at the bottom of the stairs, it may be expected that the velocity of an object moving away from the electronic device 102 (i.e., climbing the stairs) will be less than the velocity of the object moving toward the device (i.e., traveling down the stairs), and the height of the object is expected to decrease when the object is moving toward the device and is expected to increase when the object is moving away from the device. This may be substantially opposite when the device 102 is positioned at a top portion of the stairs. Additionally, or alternatively, the user account data may be utilized to indicate attributes of users in the environment, such as which users are associated with given personal devices such as mobile phones, the heights of such users, user categories such as adult or child, a number of users in the environment, the ages of users, etc. In these examples, this user account data may be utilized to identify the person involved in a fall event and/or to determine what action to take in response to detecting the fall event, for example.

The user registry component 130 may be configured to determine and/or generate associations between users, user accounts, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the devices 102. The user registry 130 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

With respect to other potential components of the remote system 104, the speech-processing system (not depicted) may be configured to receive audio data from the devices 102 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "I need help," the NLU component may identify a "help" intent and the payload may be "present user." In this example where the intent data indicates an intent to receive aid, the speech-processing system may call one or more speechlets to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component, such as by an orchestrator of the remote system 104, and may perform operations to instruct the device 102 to perform an operation. The remote system 104 may generate audio data confirming that a communication channel has been established, in examples, such as by the TTS component. The audio data may be sent from the remote system 104 to the device 102 for output of corresponding audio by the speakers of the device 102.

It should be noted that while text data is described as a type of data utilized to communicate between various components of the remote system 104 and/or other systems and/or devices, the components of the remote system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 104 and the associated functionality of those components as described herein may be performed by one or more of the electronic devices 102 and/or personal devices. Additionally, or alternatively, some or all of the components and/or functionalities associated with the electronic devices 102 and/or personal devices may be performed by the remote system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 104 may possess its own local memory, which also may store program components, program data, and/or one or more operating systems.

The memory 114 and/or the memory described with respect to the components of the remote system 104 may include volatile and nonvolatile memory, removable and non-removable media implemented in any method or technology for storage of information, such as computer-readable instructions, data structures, program component, or other data. Such memory 114 and/or the memory described with respect to the components of the remote system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 104 may be implemented as computer-readable storage media ("CRSM"), which may be any available physical media accessible by the processor(s) 110 and/or the processor(s) described with respect to the remote system 104 to execute instructions stored on the memory 114 and/or the memory described with respect to the components of the remote system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) described with respect to the components of the remote system 104 may enable messages between the components and/or devices shown in system 100 and/or with one or more other polling systems, as well as other networked devices. Such network interface(s) 112 and/or the network interface(s) described with respect to the components of the remote system 104 may include one or more network interface controllers (NICs) or other types of transceiver devices to send and receive messages over the network 106.

For instance, each of the network interface(s) 112 and/or the network interface(s) described with respect to the components of the remote system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 104 may include a wide area network (WAN) component to enable message over a wide area network.

In some instances, the remote system 104 may be local to an environment associated the electronic devices 102 and/or personal devices. For instance, the remote system 104 may be located within one or more of the electronic devices 102 and/or personal devices. In some instances, some or all of the functionality of the remote system 104 may be performed by one or more of the electronic devices 102 and/or personal devices. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
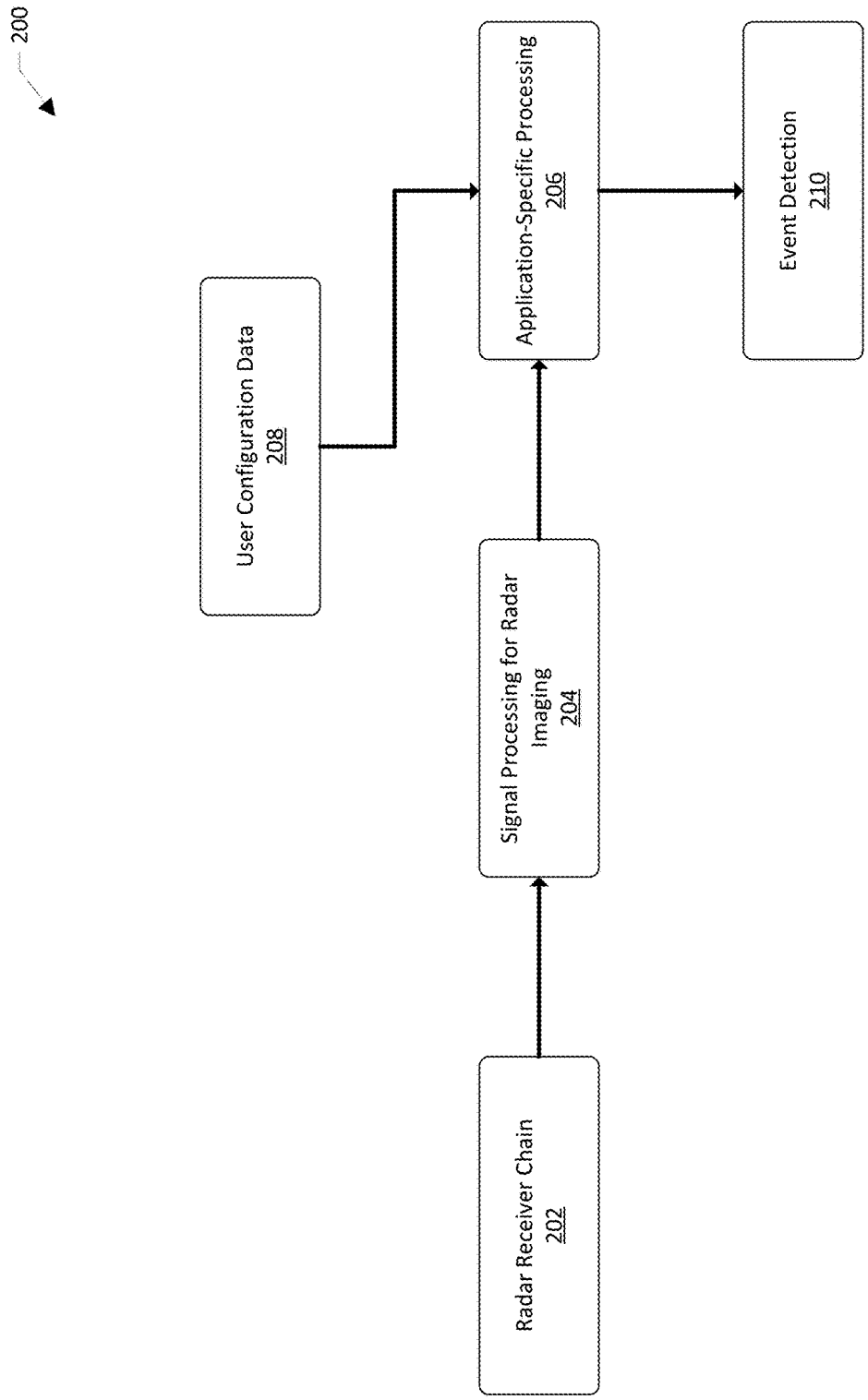
FIG. 2 illustrates a conceptual diagram of components and related operations for fall detection on uneven surfaces utilizing radar.

FIG. 2 illustrates a conceptual diagram of components and related operations for fall detection on uneven surfaces utilizing radar.

For example, processes for detecting a fall event on an uneven surface may initiate with a radar receiver chain 202 receiving energy as reflected by objects in an environment including an uneven surface, such as stairs. For example, an electronic device positioned in the environment may include a radar transmitter and a radar receiver array. The radar transmitter may be configured to produce and emit electromagnetic waves in the radio or microwave domain. One or more transmitting antennas of the electronic device may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device may include the radar receiver array, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A sensor data generator of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver. Sensor data corresponding to the received energy may be generated and utilized for further processing as described herein.

At block 204, signal processing for radar imaging may be performed. For example, based at least in part on the type of device at issue, the position of the device in the environment, and/or a configuration of the device, the sensor data may be processed to provide relevant data for detecting an event, such as a fall event. For example, when the device is of the type, positioned, or otherwise configured to detect fall events on uneven surfaces, the sensor data may be utilized to generate a point cloud of the object traversing the uneven surface and/or the sensor data may be formatted such that it may be utilized to determine changes in height of the object as the object traverses the stairs. With respect to the point cloud data, a point cloud generator may be configured to generate a point cloud representing rates of energy intensity change associated with the environment. For example, a given coordinate of the points may be associated with a first energy intensity and an adjoining or other associated coordinate may be associated with a second energy intensity. In examples where there is a large rate of change of those intensities, the rate of change may indicate the presence of a surface and/or object. In examples where there is a small rate of change, an object may not be present and/or a small object may be present instead of a large object. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator may also be configured to determine one or more sectors of the point cloud. For example, groupings and/or clusters of points in a given area may be determined to be a sector. The sectors may also include an amount of space outside the grouping of points.

At block 206, application-specific processing may be performed. As described specifically in this application, the application-specific processing may be associated with detection of fall events on uneven surfaces in an environment. Other application-specific processing may include, for example, determining fall events on even surfaces, determining areas of an environment where fall events occur, determining boundaries of environments, identifying users involved in predefined events, determining what action to take when an event is determined, determining a position and/or posture of a user in the environment, and/or determine a type of event occurring in the environment. In the example where the application-specific processing is associated with detection of fall events on uneven surfaces, a velocity component and/or a height component may be utilized as described herein.

User-configuration data 208 may also be queried for and received. The user-configuration data 208 may be utilized to assist in detection of events. This information may be utilized by the electronic device to determine whether a fall event has occurred and/or to whom the fall event should be attributed. For example, the user-configuration data 208 may indicate a position of the electronic device as placed by a user in the environment. In these examples, placement of the electronic device at a bottom portion of the stairs or placement of the electronic device at the top portion of the stairs may be utilized to determine what velocity and height value thresholds to utilize. For example, when the device is placed at the bottom of the stairs, it may be expected that the velocity of an object moving away from the electronic device (i.e., climbing the stairs) will be less than the velocity of the object moving toward the device (i.e., traveling down the stairs), and the height of the object is expected to decrease when the object is moving toward the device and is expected to increase when the object is moving away from the device. This may be substantially opposite when the device is positioned at a top portion of the stairs. Additionally, or alternatively, the user-configuration data 208 may be utilized to indicate attributes of users in the environment, such as which users are associated with given personal devices such as mobile phones, the heights of such users, user categories such as adult or child, a number of users in the environment, the ages of users, etc. In these examples, this user-configuration data 208 may be utilized to identify the person involved in a fall event and/or to determine what action to take in response to detecting the fall event, for example.

At block 210, event detection processes may be performed. For example, an event component may be configured to utilize the indications from the velocity component and/or the height component and/or the data indicating the object velocity and height to determine if a fall event has occurred. For example, when the event component determines that the velocity satisfies the threshold velocity and the height value satisfies the threshold height value at or near the same time, the event component may determine that a fall event is likely to have occurred and may, in examples, determine a confidence value associated with the fall event determination. In other examples, the event component may perform the comparison of the sample values with the thresholds as described herein. It should be understood that while threshold comparisons are utilized as an example for determining if a fall event has occurred, this disclosure includes other methodologies for determining whether given sample values indicate that a fall has occurred, such as determining a score associated with given values. When the event component determines that a fall event has occurred, one or more actions may be performed, such as causing a voice interface device to output audio into the environment requesting user input confirming or denying that the event occurred and/or to establish a communication channel with another device, such as a device associated with emergency services and/or an emergency contact. Other actions are also included in this disclosure, such as sending notifications to one or more devices, sounding an alarm, dispatching emergency services, gathering additional information about the environment, etc.

Figure 3:
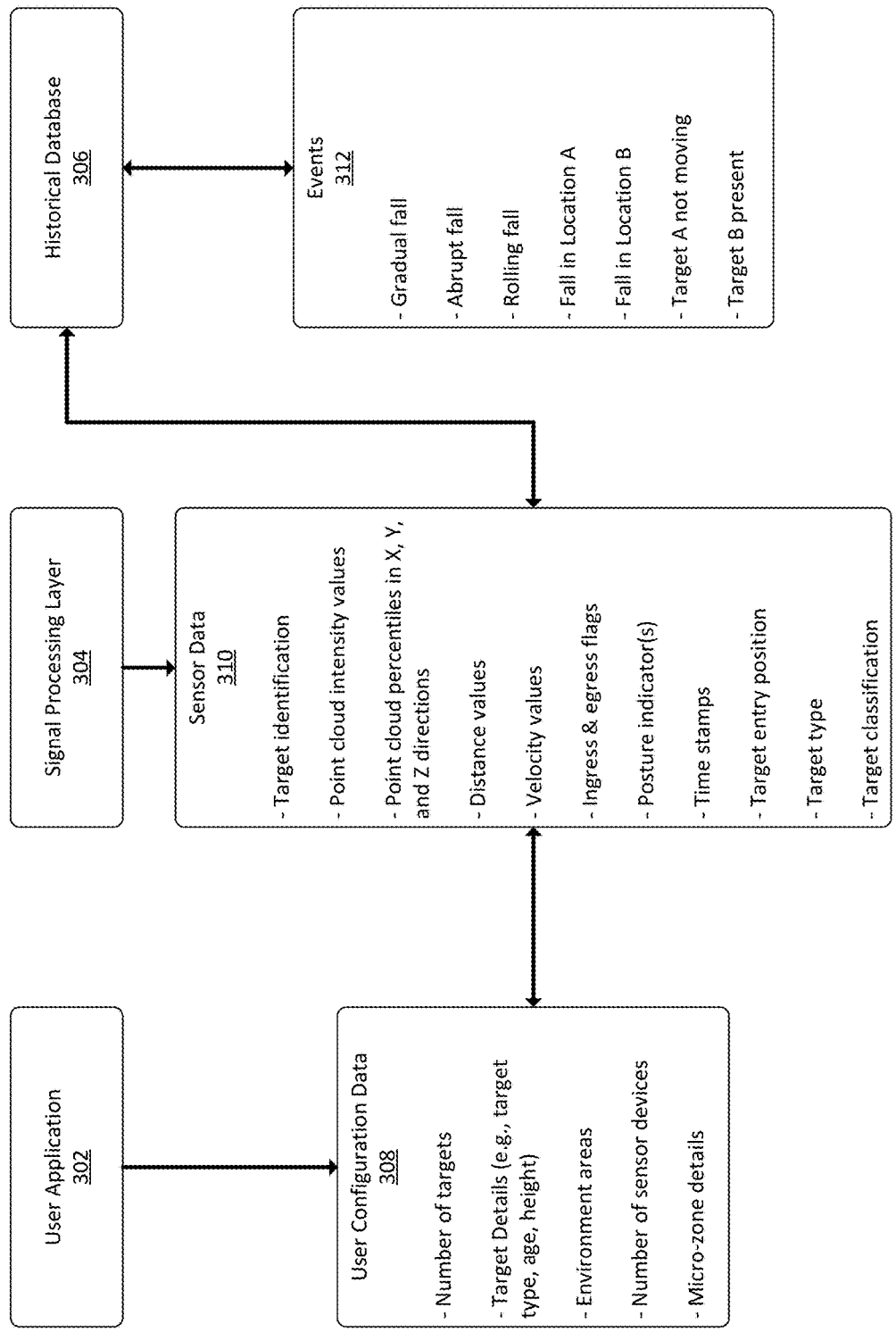
FIG. 3 illustrates a conceptual diagram of data utilized and/or generated in relation to fall detection on uneven surfaces utilizing radar.

FIG. 3 illustrates a conceptual diagram of data utilized and/or generated in relation to fall detection on uneven surfaces utilizing radar. The data represented in FIG. 3 is shown as being generated by and/or used by a user application 302, a signal processing layer 304, and/or by a historical database 306. The user application 302 may be an application downloaded and/or otherwise accessible by a user device, such as a mobile phone. The user application 302 may be associated with the electronic device that performs the fall detection processes described herein and/or with a voice interface device. The signal processing layer 304 may include one or more components as described herein for detecting events, such as a sensor data generator, a point cloud generator, a velocity component, a height component, and/or an event component. The historical database 306 may include indications of events that have been detected and, in examples, a timestamp associated with the events and/or contextual information about the events. The historical database 306 may also include the sensor data 310 as described herein.

Returning to the user application 302, at various times such as during setup of one or more devices and/or when the user application 302 is downloaded, and/or at other times when a user is interacting with the user application 302, user-configuration data 308 may be provided by the user and stored, for example, in a user registry. That user-configuration data 308 may include, for example, a number of targets (or otherwise moveable objects) in a given environment, target details such as a target type (such as adult, or child, or pet), target age, target height, etc., areas within the environment and/or naming indicators of those areas, a number of electronic devices that have radar sensors, and/or microzone details about the environments, such as a zone related to a "couch" or a "kitchen counter" or "stairs."

This user-configuration data 308 as well as the event data from the signal processing layer 304 may be utilized to generate sensor data 310. The sensor data 310 may include information associated with an event, such as, for example, identification of a target involved in an event, point cloud intensity values associated with the event, point cloud percentiles in one or more of the measured directions, distance values of the object in question, velocity values of the object in question, ingress and/or egress flags indicating points of ingress and/or egress from an environment or portion of an environment, posture indicators, timestamps of the events, target entry positions, target type, and/or target classification, for example. Some or all of this information may be utilized to determine, for example, an action to be taken and/or to further improve the detection of subsequent events.

The sensor data 310 may be stored or otherwise utilized by the historical database 306 to store indications of events 312. Example events 312 and details associated therewith are illustrated in FIG. 3. Some of those example events 312 include detection of a gradual fall, an abrupt fall, a rolling fall, a fall in a given location (Location A), a fall in a different location (Location B), detection of an event where a target (Target A) is not moving, detection of presence of a target (Target B), etc. Additional or different events may also be stored in association with the historical database 306 than those specifically illustrated in FIG. 3.

Figure 4:
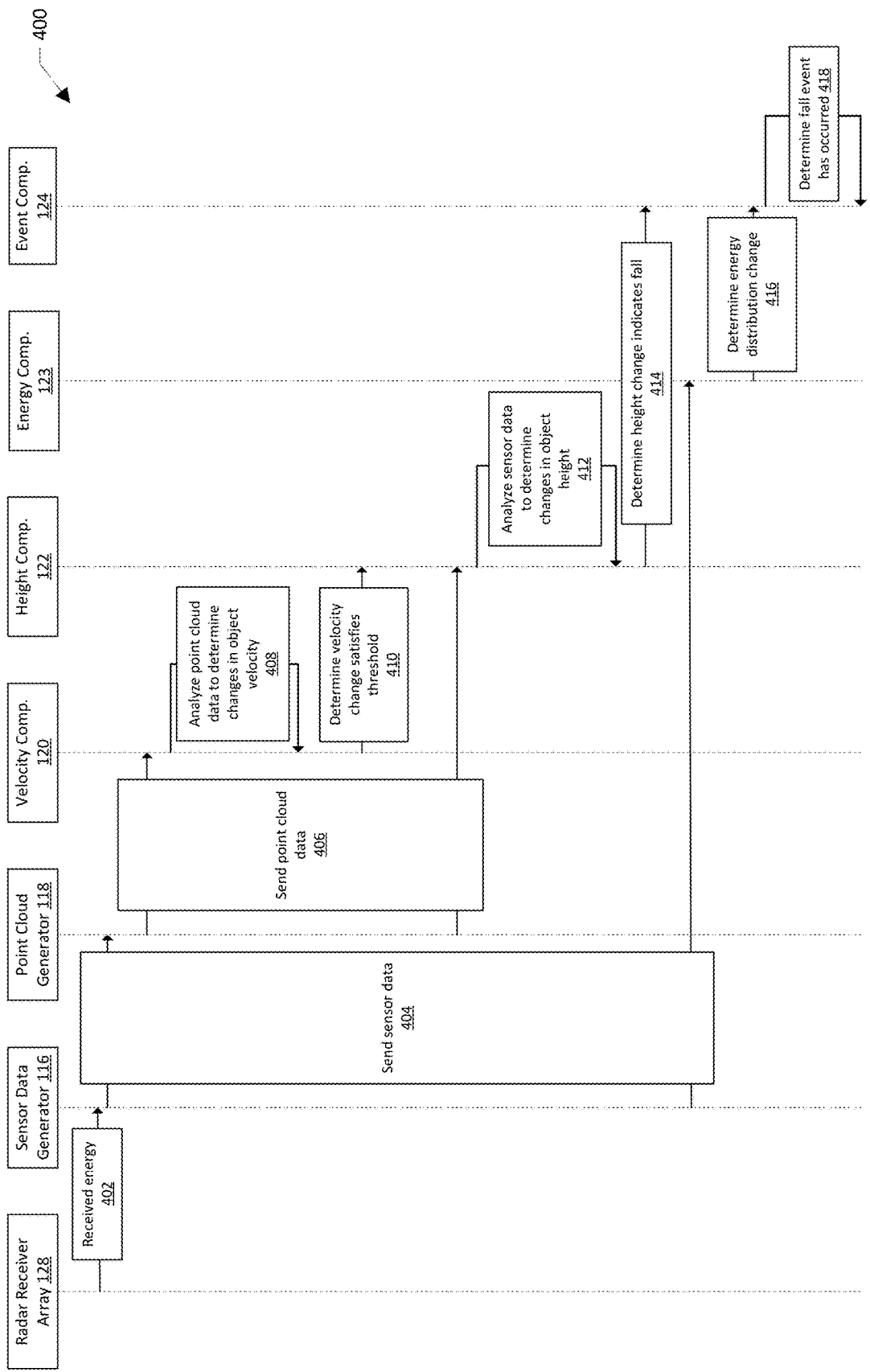
FIG. 4 illustrates a sequence diagram of example processes for fall detection on uneven surfaces utilizing radar.

FIG. 4 illustrates a sequence diagram of example processes 400 for fall detection on uneven surfaces utilizing radar. It should be understood that while the sequence diagram 400 is described in a stepwise manner, some or all of the operations described with respect to FIG. 4 may be performed in a different order and/or in parallel.

At block 402, the radar receiver array 128 may receive energy as reflected off surfaces in an environment and may send that received energy to the sensor data generator 116. For example, a radar transmitter may be configured to produce and emit electromagnetic waves in the radio or microwave domain. One or more transmitting antennas of the electronic device may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device may include the radar receiver array 128, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s).

At block 404, the sensor data generator 116 may generate the sensor data corresponding to the received energy. The sensor data may indicate positions of objects in the environment as well as how those positions change and size information about the objects. The sensor data generator 116 may provide the sensor data to a point cloud generator 118 and to the energy component 123. A sensor data generator of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

At block 406, the point cloud generator 118 may generate a point cloud representing one or more moving objects in the environment. The point cloud generator 118 may send data representing the point cloud(s) to a velocity component 120. The point cloud generator 118 may be configured to generate a point cloud representing rates of energy intensity change associated with the environment. For example, a given coordinate of the points may be associated with a first energy intensity and an adjoining or other associated coordinate may be associated with a second energy intensity. In examples where there is a large rate of change of those intensities, the rate of change may indicate the presence of a surface and/or object. In examples where there is a small rate of change, an object may not be present and/or a small object may be present instead of a large object. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator 118 may also be configured to determine one or more sectors of the point cloud. For example, groupings and/or clusters of points in a given area may be determined to be a sector. The sectors may also include an amount of space outside the grouping of points.

At block 408, the velocity component 120 may analyze the point cloud data and determine changes in the velocity of the object, such as in one or more directions. The directions may include in a first direction that is toward and/or away from the device that received the reflected energy from the environment, in a second direction that is substantially perpendicular to the first direction, such as from side to side with respect to the device, and/or in a third direction indicative of a height of the object. The velocity component 120 may be configured to utilize the data representing the point cloud to determine a velocity of a given object in the environment, such as in multiple directions. For example, the velocity component 120 may be configured to determine a velocity of a given object on the uneven surface in a first direction, also described herein as the Y direction, which may be a direction that is substantially toward and away from the device that transmits and/or receives the energy from the environment. In this example, the Y direction indicates a velocity at which the object is travelling up or down the stairs given the location of the device as being positioned, for example, at the top or the bottom of the stairs. In these examples, a person may traverse the stairs typically at a fairly constant velocity, for example at 1 meter per second. Subtle variations in the velocity may also be typical, such as when certain pauses or decreases in velocity as each step is taken when the person is climb up the stairs. Also, typically a person will travel down the stairs at a slightly faster velocity than climbing up the stairs. However, when a person is climbing up the stairs, a fall event may occur when the velocity goes from a steady rate and then decreases suddenly, such as to 0. While this may indicate a fall event, it may also simply indicate that the person has purposefully stopped climbing the stairs. As such, additional signals may be utilized to determine if this sudden drop in velocity is attributable to a fall event. When a person is traveling down the stairs, a fall event may occur when the velocity goes from a first steady rate, increases suddenly and/or changes frequently over a period of time, and then decreases to 0 or near 0. In these examples, a person traveling down the stairs may have fallen down at least a portion of the stairs, attributable to the increased velocity, and then landed at the bottom of the stairs, attributable to the 0 or near 0 velocity. Still, this velocity change may be attributable to, instead of a fall event, a person simply deciding to travel more quickly down the stairs and then stop at the bottom of the stairs purposefully. As such, additional signals may be utilized to determine if this velocity pattern is attributable to a fall event.

In addition to velocity in the Y direction, the velocity component 120 may also determine velocity of the object in other directions, such as a second direction, also described herein as the X direction, indicating side to side motion of a person on the uneven surface. For example, when a person traverses stairs, that person may typically be positioned on a side of the stairs where a handrail is present and may stay substantially on that side of the stairs during the duration of the travel on the stairs. However, when a fall event occurs, the side to side motion of the person may differ, sometimes substantially, from how the side to side movement of the person would be absent a fall event. For example, when the velocity of the person in the X direction indicates a first minimal X direction velocity and then a sudden increase in velocity in either one direction or back and forth, such as signal may indicate that the person has fallen at least partially sideways on the stairs. By way of further example, a rate of change of the perceived height of the person, also described herein as a rate of change in the Z direction, may be determined. In these examples, when a person traverses an uneven surface without incident, it is expected that the height will steadily or substantially steadily increase when the person is climbing up the uneven surface or decrease when the person is traveling down the uneven surface. However, when a fall event occurs, the height change may increase suddenly, indicating that the person is no longer in a standing position. Some or all of these velocities and/or rates of perceived height change may be determined and utilized by the event component 124 to determine if a fall event has occurred on the uneven surface of the environment. The velocity component 120 may determine the velocities of the object over time utilizing, for example, the data representing the point cloud of the object as generated by the point cloud generator 118. In examples, a centroid of the point cloud may be determined and may be utilized as a reference position of the object over time to determine positional changes of the object.

At block 410, the velocity component 120 may determine that the velocity in one or more of the directions satisfies a predefined threshold velocity. In these examples, the velocity component 120 may send an indication that the velocity satisfies the predefined threshold velocity to an event component 124. In examples, the velocity component 120 may compare the velocity values indicating the velocity of the object in the one or more directions to one or more threshold velocities to determine if a determined velocity is problematic. When one or more of the velocities satisfy one or more of the threshold velocities, the velocity component 120 may send data to the event component 124 indicating as much, and in examples, the data representing the velocity of the object during the subject time.

At block 412, utilizing the point cloud data, a height component 122 may analyze the point cloud data and determine changes in a height of one or more of the moving objects. The height component 122 may be configured to determine a height of an object over time. For example, the sensor data and/or the data representing the point cloud of the object may indicate a point of the object that has is at a maximum in the Z direction, or otherwise a top-most point of the object, also described herein as zMax. This point may represent a height of the object in the environment. The height component 122 may determine the height of the object over time in the environment, particularly when the object traverses the uneven surface. When a person traverses the uneven surface without incident, it is expected that the height of the person will increase steadily as the person climbs the uneven surface and decrease steadily as the person travels down the uneven surface. However, when a fall event occurs, the height of the person may decrease suddenly, indicating that either the person has purposefully laid down on or near the uneven surface or the person has fallen.

At block 414, the height component 122 may determine that a height change of a given object satisfies a predefined threshold height change. In these examples, the height component 122 may send an indication that the height change satisfies the predefined threshold height change to the event component 124. The height component 122 may be configured to compare the height values of the object with threshold height values to determine if a given height value or set of height values is potentially problematic and indicative of a fall event. In these examples, when the height component 122 determines that the height value satisfies the threshold height value, the height component 122 may send data to the event component 124 indicating as much, and in examples, the data representing the height of the object during the subject time.

At block 416, the energy component 123 may utilize the sensor data to determine an energy distribution of energy reflected off the object. For example, when the object is a human and the human is standing, the energy distribution of energy reflected offer the human may be evenly or substantially evenly distributed from a top portion of the human to a bottom portion of the human. In the event that the human falls, the energy distribution may change such that a majority or substantially all of the reflected energy is distributed near the bottom portion of the human and/or that a high quantity of reflected energy is reflected near the bottom portion of the human. This may indicate that the human is no longer standing and is instead situated near or on the floor of the environment. The energy component 123 may send data to the event component 124 indicating this change in energy distribution, and in examples, the data representing the changed energy distribution.

At block 418, the event component 124 may utilize the indications provided by the velocity component 120, the height component 122, and/or the energy component 123 to determine that a fall event has occurred. The event component 124 may be configured to utilize the indications from the velocity component 120, the height component 122, the energy component 123, and/or the data indicating the object velocity and height to determine if a fall event has occurred. For example, when the event component 124 determines that the velocity satisfies the threshold velocity and the height value satisfies the threshold height value at or near the same time, the event component 124 may determine that a fall event is likely to have occurred and may, in examples, determine a confidence value associated with the fall event determination. In other examples, the event component 124 may perform the comparison of the sample values with the thresholds as described herein. Additionally, the event component 124 may determine that a fall event occurs when the energy distribution indicates that reflected energy off the object has changed such that most or all of the energy is distributed at or near a floor portion of the environment instead of an even or substantially even distribution of energy from a top portion of the object to a bottom portion of the object. It should be understood that while threshold comparisons are utilized as an example for determining if a fall event has occurred, this disclosure includes other methodologies for determining whether given sample values indicate that a fall has occurred, such as determining a score associated with given values. When the event component 124 determines that a fall event has occurred, one or more actions may be performed, such as causing a voice interface device 108 to output audio into the environment requesting user input confirming or denying that the event occurred and/or to establish a communication channel with another device, such as a device associated with emergency services and/or an emergency contact. Other actions are also included in this disclosure, such as sending notifications to one or more devices, sounding an alarm, dispatching emergency services, gathering additional information about the environment, etc.

Figure 5A:
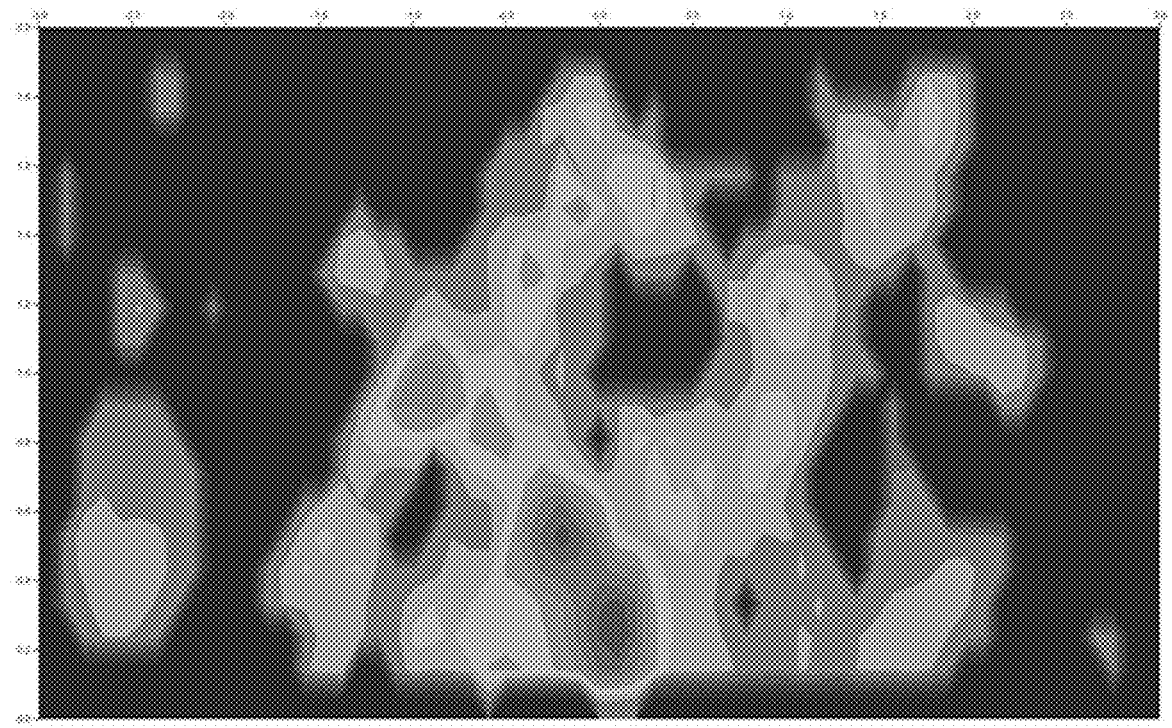
FIG. 5A illustrates a graph showing an example energy distribution when a person is falling.

FIG. 5A illustrates a graph showing example energy distribution when a person is falling. For example, energy distribution information associated with the object in question may be utilized to determine whether a fall event has occurred. For example, when the energy reflected off the object is received at the electronic device, the quantity of energy associated with particular coordinates in the environment may be useful for determining whether a fall even has occurred. To illustrate, when a person is standing in an environment, the energy reflected off that person may be generally distributed evenly throughout the shape of the person. In other words, energy may be distributed in the Z direction from the top of the standing person's head to the bottom of the person's feet, with a small amount of the energy distributed at the bottom or feet portion of the person. However, when a person falls to the floor, the energy reflected off the person may be concentrated near a floor portion of the environment and may be more intense than when the person is standing because the surface area of the person may have decreased from the point of view of the electronic device.

For example, a 60 GHz millimeter wave MIMO radar may be capable of resolving the energy being reflected back from an object into a three-dimensional grid. The unit of this grid may be dependent on the bandwidth and the number of antennas in the array. The higher the bandwidth and the higher the number of antennas, the finer the grid spacing and the more accurate the three-dimensional energy profile of the target will be. The ratio of the energy in different grid blocks may be used to detect a fall. In examples, an uneven surface may be at an angle with respect to the absolute location of the energy. In these examples, the energy grid blocks may not be used, however the ratio of energy is independent of this angle and hence may provide a more accurate representation of the pose of the object.

As shown in FIG. 5A, when a person falls, the energy associated with that fall may be greater than the energy associated with a person standing still. Additionally, that energy may be associated with locations in an environment that differ from the locations associated with a person standing. For example, when a person falls, that person may move in many directions, such as down toward the ground, away from our toward the sensing device, and/or from side to side with respect to the device. This may cause the energy distribution associated with the falling person to appear more spread out as shown in FIG. 5A and show a higher energy intensity at locations where the person falls to the ground.

Figure 5B:
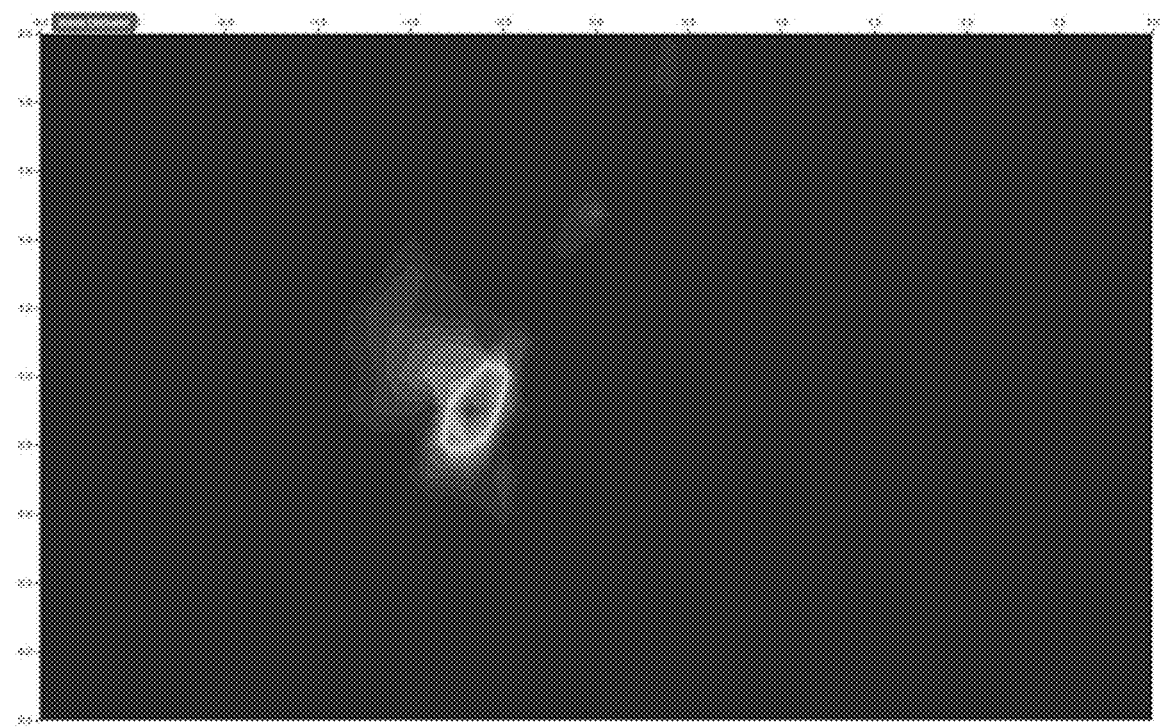
FIG. 5B illustrates a graph showing an example energy distribution when a person is standing.

FIG. 5B illustrates a graph showing example energy distribution when a person is standing. The energy distribution may be determined in the same or a similar way as described with respect to FIG. 5A, but here the person is standing and has not fallen. As can be seen in FIG. 5B when compared to FIG. 5B, the energy distribution associated with the person is more focused in one region of the graph, indicating less intense energy associated with the person and little energy movement. The system described herein may utilize energy distributions, such as those described with respect to FIGS. 5A and 5B, to determine if a given energy distribution indicates that a fall event has occurred.

Figure 6:
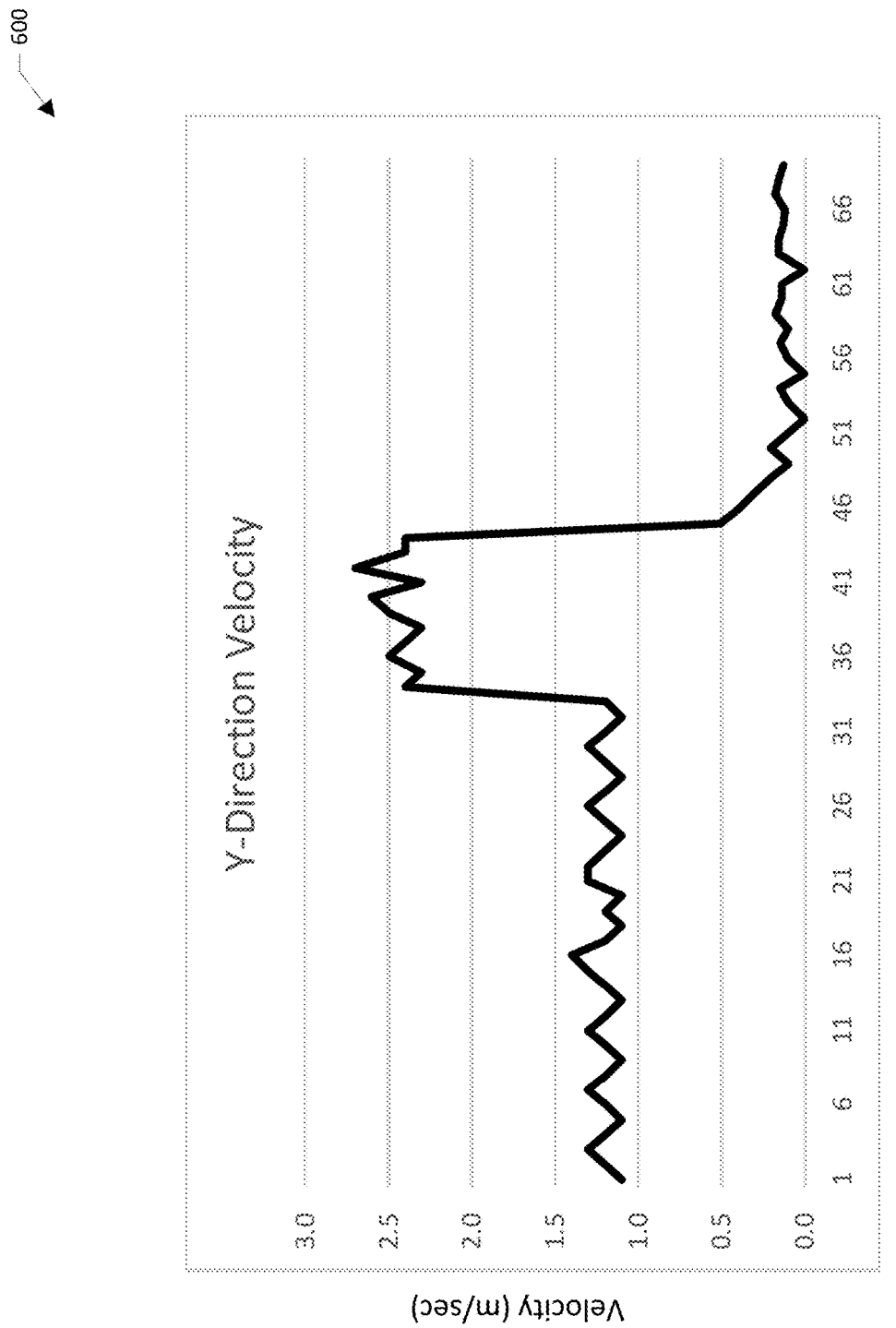
FIG. 6 illustrates a chart of example velocity changes of an object that has fallen down at least a portion of an uneven surface in an environment.

FIG. 6 illustrates a chart 600 of example velocity changes of an object that has fallen down at least a portion of an uneven surface in an environment. For example, a velocity component may be configured to utilize the data representing the point cloud to determine a velocity of a given object in the environment, such as in multiple directions. For example, the velocity component may be configured to determine a velocity of a given object on the uneven surface in a first direction, also described herein as the Y direction, which may be a direction that is substantially toward and away from the device that transmits and/or receives the energy from the environment. In this example, the Y direction indicates a velocity at which the object is travelling up or down the stairs given the location of the device as being positioned, for example, at the top or the bottom of the stairs. In these examples, a person may traverse the stairs typically at a fairly constant velocity, for example at 1 meter per second. Subtle variations in the velocity may also be typical, such as when certain pauses or decreases in velocity as each step is taken when the person is climb up the stairs. Also, typically a person will travel down the stairs at a slightly faster velocity than climbing up the stairs. However, when a person is climbing up the stairs, a fall event may occur when the velocity goes from a steady rate and then decreases suddenly, such as to 0. While this may indicate a fall event, it may also simply indicate that the person has purposefully stopped climbing the stairs. As such, additional signals may be utilized to determine if this sudden drop in velocity is attributable to a fall event. When a person is traveling down the stairs, a fall event may occur when the velocity goes from a first steady rate, increases suddenly and/or changes frequently over a period of time, and then decreases to 0 or near 0. In these examples, a person traveling down the stairs may have fallen down at least a portion of the stairs, attributable to the increased velocity, and then landed at the bottom of the stairs, attributable to the 0 or near 0 velocity. Still, this velocity change may be attributable to, instead of a fall event, a person simply deciding to travel more quickly down the stairs and then stop at the bottom of the stairs purposefully. As such, additional signals may be utilized to determine if this velocity pattern is attributable to a fall event.

In addition to velocity in the Y direction, the velocity component may also determine velocity of the object in other directions, such as a second direction, also described herein as the X direction, indicating side to side motion of a person on the uneven surface. For example, when a person traverses stairs, that person may typically be positioned on a side of the stairs where a handrail is present and may stay substantially on that side of the stairs during the duration of the travel on the stairs. However, when a fall event occurs, the side to side motion of the person may differ, sometimes substantially, from how the side to side movement of the person would be absent a fall event. For example, when the velocity of the person in the X direction indicates a first minimal X direction velocity and then a sudden increase in velocity in either one direction or back and forth, such as signal may indicate that the person has fallen at least partially sideways on the stairs. By way of further example, a rate of change of the perceived height of the person, also described herein as a rate of change in the Z direction, may be determined. In these examples, when a person traverses an uneven surface without incident, it is expected that the height will steadily or substantially steadily increase when the person is climbing up the uneven surface or decrease when the person is traveling down the uneven surface. However, when a fall event occurs, the height change may increase suddenly, indicating that the person is no longer in a standing position. Some or all of these velocities and/or rates of perceived height change may be determined and utilized by an event component to determine if a fall event has occurred on the uneven surface of the environment. The velocity component may determine the rates-of-change of the position of the object over time utilizing, for example, the data representing the point cloud of the object as generated by the point cloud generator. In examples, a centroid of the point cloud may be determined and may be utilized as a reference position of the object over time to determine positional changes of the object.

As shown specifically in FIG. 6, over the course of approximately 70 frames, the velocity of an object traversing an uneven surface of an environment is measured. During the first approximately 30 frames, the velocity fluctuates between approximately 1.0 and 1.5 meters per second. This velocity indicates a person travelling down the uneven surface at a somewhat constant rate, which variations likely caused by the act of step, such as down stairs. However, at approximately 30 frames, the velocity increases drastically to approximately 2.3 meters per second and stays at or above that velocity for another approximately 15 frames before decreasing drastically to near 0 velocity. This indicates that the object started moving more quickly down the stairs and then did not move much if at all. Such a velocity pattern may indicate that the person fell down the stairs at approximately 30 frames and landed at or near the bottom of the stairs and is not moving or is moving very little. This velocity pattern may be utilized to determine that a fall event has occurred.

It should be understood that velocity change measurements may differ depending on whether the object is moving toward or away from the radar device, and/or whether the radar device is situated at a top portion of the stairs or a bottom portion of the stairs. The device may be configured to determine velocity and/or height changes in each of these configurations and determine if that velocity and/or height changes indicate that a fall event has occurred.

Figure 7:
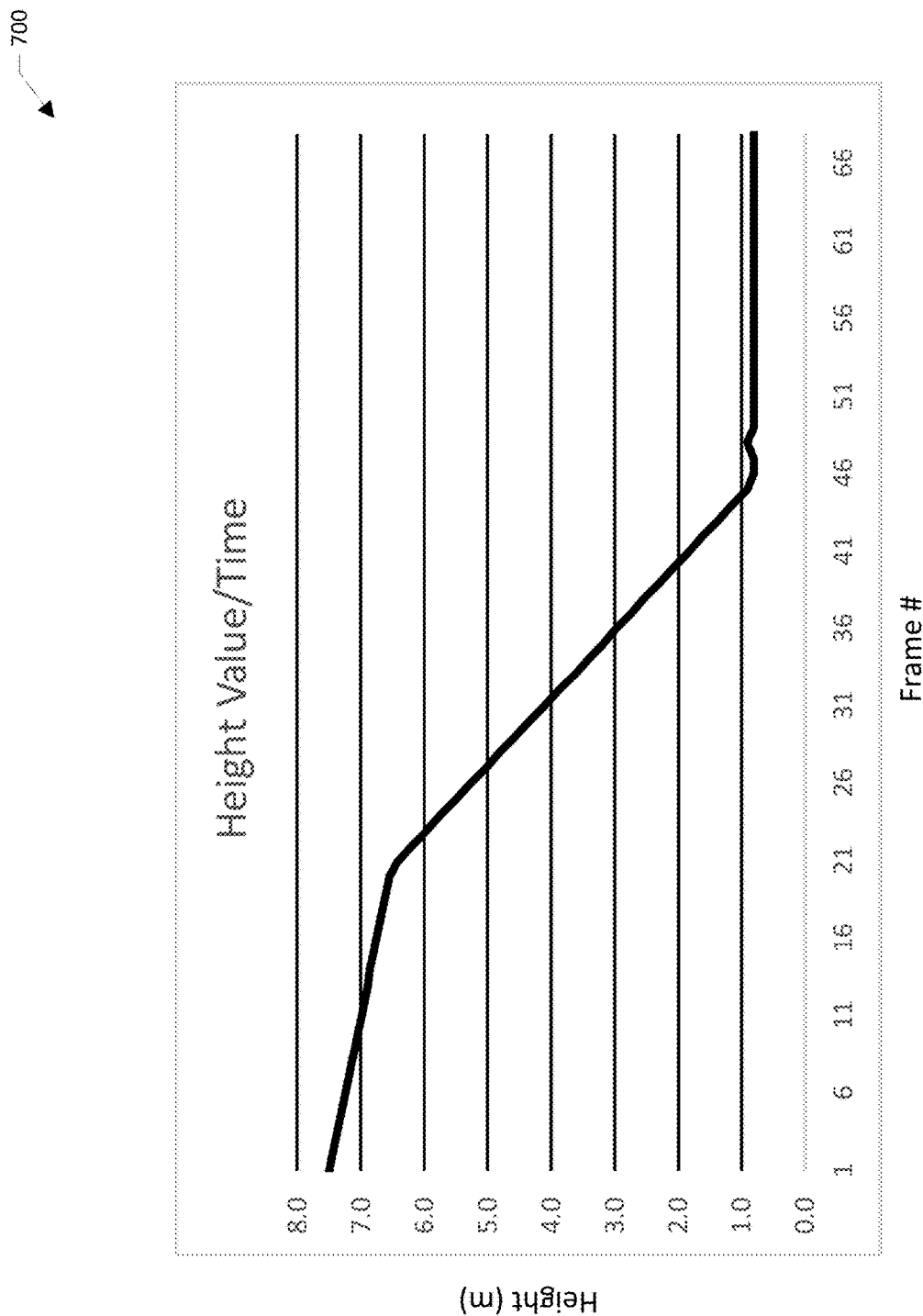
FIG. 7 illustrates a chart of example height changes of an object that has fallen down at least a portion of an uneven surface in an environment.

FIG. 7 illustrates a chart 700 of example height changes of an object that has fallen down at least a portion of an uneven surface in an environment. For example, a height component may be configured to determine a height of an object over time. For example, the sensor data and/or the data representing the point cloud of the object may indicate a point of the object that has is at a maximum in the Z direction, or otherwise a top-most point of the object, also described herein as zMax. This point may represent a height of the object in the environment. The height component may determine the height of the object over time in the environment, particularly when the object traverses the uneven surface. When a person traverses the uneven surface without incident, it is expected that the height of the person will increase steadily as the person climbs the uneven surface and decrease steadily as the person travels down the uneven surface. However, when a fall event occurs, the height of the person may decrease suddenly, indicating that either the person has purposefully laid down on or near the uneven surface or the person has fallen. The height component may be configured to compare the height values of the object with threshold height values to determine if a given height value or set of height values is potentially problematic and indicative of a fall event. In these examples, when the height component determines that the height value satisfies the threshold height value, the height component may send data to the event component indicating as much, and in examples, the data representing the height of the object during the subject time.

As shown in FIG. 7, the height value starts at approximately 7.5 meters, indicating a person's starting position on a top portion of a staircase, and the height value decreases at an approximately constant rate over the first approximately 20 frames. However, the height value then decreases at a greater rate from frames 20 to approximately 45. This indicates that the person's measured height is decreasing faster than it previously was. Then, over approximately frames 45 to 70, the measured height remains mostly constant at less than 1.0 meters. This height value pattern may indicate that, around frame 20, the person started falling down the stairs at a faster rate than prior to frame 20 and that the person is in a non-standing position because the ending height of the person is less than 1 meter. This may indicate that the person fell down at least a portion of the stairs and is in a non-standing position, which may mean that the person requires assistance. It should be understood that the change in height value may be analyzed in relation to when the velocity of the object is indicated to be problematic, as discussed herein. For example, when the velocity of the object indicates a fall event, a window of time preceding when that velocity is indicated to be problematic may be analyzed to determine if the height value change during that window of time also indicates that a fall event has occurred.

Figure 8:
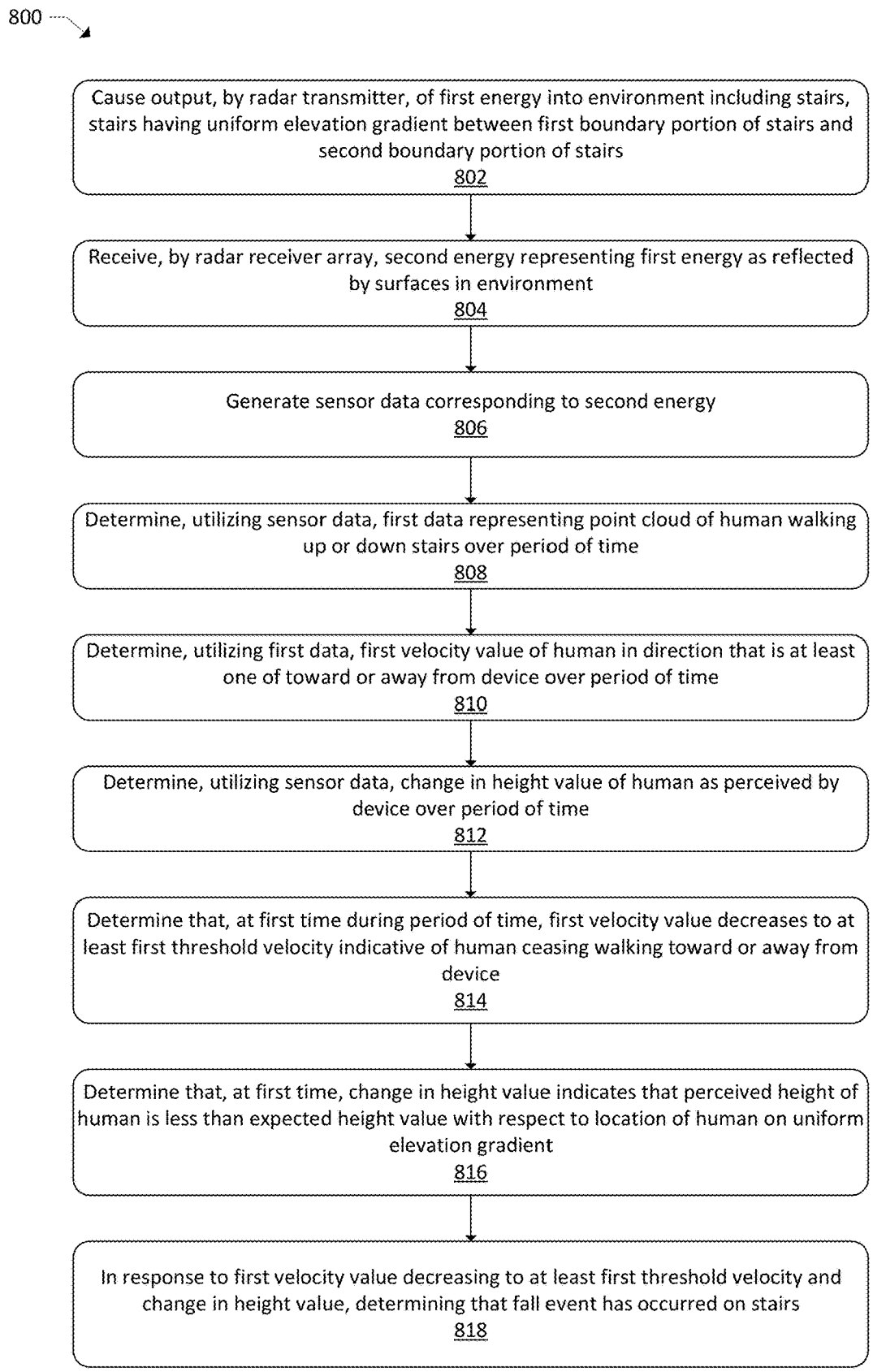
FIG. 8 illustrates a flow diagram of an example process for fall detection on uneven surfaces utilizing radar.

FIGS. 8 and 9 illustrate processes for fall detection on uneven surfaces utilizing radar. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 10, although the processes may be implemented in a wide variety of other environments, architectures and systems.

FIG. 8 illustrates a flow diagram of an example process 800 for fall detection on uneven surfaces utilizing radar. The order in which the operations or steps are described is not intended to be construed as a limitation, and any number of the described operations may be combined in any order and/or in parallel to implement process 800.

At block 802, the process 800 may include causing output, by the radar transmitter, of first energy into an environment including stairs, the stairs having a uniform elevation gradient between a first boundary portion of the stairs and a second boundary portion of the stairs. Example boundary portions are described with respect to FIG. 1, above. For example, an electronic device may include a radar transmitter and a radar receiver array. The radar transmitter may be configured to produce and emit electromagnetic waves in the radio or microwave domain. One or more transmitting antennas of the electronic device may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment.

At block 804, the process 800 may include receiving, by the radar receiver array, second energy representing the first energy as reflected by surfaces in the environment. For example, the transmitted energy may reflect off the objects and/or walls and return to one or more receiving antennas. For example, the electronic device may include the radar receiver array, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A sensor data generator of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

At block 806, the process 800 may include generating sensor data corresponding to the second energy. For example, a sensor data generator of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

At block 808, the process 800 may include determining, utilizing the sensor data, first data representing a point cloud of a human walking up or down the stairs over a period of time. For example, a point cloud generator may be configured to generate a point cloud representing rates of energy intensity change associated with the environment. For example, a given coordinate of the points may be associated with a first energy intensity and an adjoining or other associated coordinate may be associated with a second energy intensity. In examples where there is a large rate of change of those intensities, the rate of change may indicate the presence of a surface and/or object. In examples where there is a small rate of change, an object may not be present and/or a small object may be present instead of a large object. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator may also be configured to determine one or more sectors of the point cloud. For example, groupings and/or clusters of points in a given area may be determined to be a sector. The sectors may also include an amount of space outside the grouping of points.

At block 810, the process 800 may include determining, utilizing the first data, a first velocity value of the human in a direction that is at least one of toward or away from the device over the period of time. For example, a velocity component may be configured to utilize the data representing the point cloud to determine a velocity of a given object in the environment, such as in multiple directions. For example, the velocity component may be configured to determine a velocity of a given object on the uneven surface in a first direction, also described herein as the Y direction, which may be a direction that is substantially toward and away from the device that transmits and/or receives the energy from the environment. In this example, the Y direction indicates a velocity at which the object is travelling up or down the stairs given the location of the device as being positioned, for example, at the top or the bottom of the stairs. In these examples, a person may traverse the stairs typically at a fairly constant velocity, for example at 1 meter per second. Subtle variations in the velocity may also be typical, such as when certain pauses or decreases in velocity as each step is taken when the person is climb up the stairs. Also, typically a person will travel down the stairs at a slightly faster velocity than climbing up the stairs. However, when a person is climbing up the stairs, a fall event may occur when the velocity goes from a steady rate and then decreases suddenly, such as to 0. While this may indicate a fall event, it may also simply indicate that the person has purposefully stopped climbing the stairs. As such, additional signals may be utilized to determine if this sudden drop in velocity is attributable to a fall event. When a person is traveling down the stairs, a fall event may occur when the velocity goes from a first steady rate, increases suddenly and/or changes frequently over a period of time, and then decreases to 0 or near 0. In these examples, a person traveling down the stairs may have fallen down at least a portion of the stairs, attributable to the increased velocity, and then landed at the bottom of the stairs, attributable to the 0 or near 0 velocity. Still, this velocity change may be attributable to, instead of a fall event, a person simply deciding to travel more quickly down the stairs and then stop at the bottom of the stairs purposefully. As such, additional signals may be utilized to determine if this velocity pattern is attributable to a fall event.

In addition to velocity in the Y direction, the velocity component may also determine velocity of the object in other directions, such as a second direction, also described herein as the X direction, indicating side to side motion of a person on the uneven surface. For example, when a person traverses stairs, that person may typically be positioned on a side of the stairs where a handrail is present and may stay substantially on that side of the stairs during the duration of the travel on the stairs. However, when a fall event occurs, the side to side motion of the person may differ, sometimes substantially, from how the side to side movement of the person would be absent a fall event. For example, when the velocity of the person in the X direction indicates a first minimal X direction velocity and then a sudden increase in velocity in either one direction or back and forth, such as signal may indicate that the person has fallen at least partially sideways on the stairs. By way of further example, the velocity in a third direction, also described herein as the Z direction, may be determined and may indicate a rate of change of the height of the person. In these examples, when a person traverses an uneven surface without incident, it is expected that the height will steadily or substantially steadily increase when the person is climbing up the uneven surface or decrease when the person is traveling down the uneven surface. However, when a fall event occurs, the height change may increase suddenly, indicating that the person is no longer in a standing position. Some or all of these velocities may be determined and utilized by an event component to determine if a fall event has occurred on the uneven surface of the environment. The velocity component may determine the rates-of-change of the position of the object over time utilizing, for example, the data representing the point cloud of the object as generated by the point cloud generator. In examples, a centroid of the point cloud may be determined and may be utilized as a reference position of the object over time to determine positional changes of the object.

At block 812, the process 800 may include determining, utilizing the sensor data, a change in a height value of the human as perceived by the device over the period of time. For example, a height component may be configured to determine a height of an object over time. For example, the sensor data and/or the data representing the point cloud of the object may indicate a point of the object that has is at a maximum in the Z direction, or otherwise a top-most point of the object, also described herein as zMax. This point may represent a height of the object in the environment. The height component may determine the height of the object over time in the environment, particularly when the object traverses the uneven surface. When a person traverses the uneven surface without incident, it is expected that the height of the person will increase steadily as the person climbs the uneven surface and decrease steadily as the person travels down the uneven surface. However, when a fall event occurs, the height of the person may decrease suddenly, indicating that either the person has purposefully laid down on or near the uneven surface or the person has fallen.

At block 814, the process 800 may include determining that, at a first time during the period of time, the first velocity value decreases to at least a first threshold velocity indicative of the human ceasing walking toward or away from the device. For example, the velocity component may compare the velocity of the object in the one or more directions to one or more threshold velocities to determine if a determined velocity is problematic. When one or more of the velocities satisfy one or more of the threshold velocities, the velocity component may send data to an event component indicating as much, and in examples, the data representing the velocity of the object during the subject time.

At block 816, the process 800 may include determining that, at the first time, the change in the height value indicates that a perceived height of the human is less than an expected height value with respect to a location of the human on the uniform elevation gradient. For example, the height component may be configured to compare the height values of the object with threshold height values to determine if a given height value or set of height values is potentially problematic and indicative of a fall event. In these examples, when the height component determines that the height value satisfies the threshold height value, the height component may send data to the event component indicating as much, and in examples, the data representing the height of the object during the subject time.

At block 818, the process 800 may include, in response to the first velocity value decreasing to the at least the first threshold velocity and the change in the height value, determining that a fall event has occurred on the stairs. For example, an event component may be configured to utilize the indications from the velocity component and/or the height component and/or the data indicating the object velocity and height to determine if a fall event has occurred. For example, when the event component determines that the velocity satisfies the threshold velocity and the height value satisfies the threshold height value at or near the same time, the event component may determine that a fall event is likely to have occurred and may, in examples, determine a confidence value associated with the fall event determination. In other examples, the event component may perform the comparison of the sample values with the thresholds as described herein. It should be understood that while threshold comparisons are utilized as an example for determining if a fall event has occurred, this disclosure includes other methodologies for determining whether given sample values indicate that a fall has occurred, such as determining a score associated with given values. When the event component determines that a fall event has occurred, one or more actions may be performed, such as causing a voice interface device to output audio into the environment requesting user input confirming or denying that the event occurred and/or to establish a communication channel with another device, such as a device associated with emergency services and/or an emergency contact. Other actions are also included in this disclosure, such as sending notifications to one or more devices, sounding an alarm, dispatching emergency services, gathering additional information about the environment, etc.

Additionally, or alternatively, the process 800 may include determining, utilizing the first data, a second velocity value of a lateral motion of the human over the period of time. The process 800 may also include determining that, at the first time, the second velocity value increases above a second threshold velocity value. In these examples, determining that the fall event has occurred may be further in response to the second velocity value increasing above the second threshold velocity value.

Additionally, or alternatively, the process 800 may include determining, utilizing the sensor data, a rate of change of the perceived height of the human over the period of time. The process 800 may also include determining that, at the first time, the rate of change indicates that the perceived height of the human decreases at a higher rate than before the first time. In these examples, determining that the fall event has occurred may be in response to the rate of change indicating that the perceived height of the human decreases at a higher rate than before the time.

Additionally, or alternatively, the process 800 may include determining, over a portion of the period of time, heatmap data of energy reflected off the human, the heatmap data representing motion of the human in time and space, wherein the heatmap data includes a cluster of energy values associated with a portion of the human. The process 800 may also include determining, at a second time prior to the first time, that the cluster represents a first perceived height of the portion of the human. The process 800 may also include determining, at the first time, that the cluster represents a second perceived height of portion of the human. The process 800 may also include determining that a rate of change of perceived height of the portion of the human from the second time to the first time exceeds a rate of change threshold value. In these examples, determining that fall event has occurred may be further based on the rate of change of the perceived height of the portion of the human from the second time to the first time FIG. 9 illustrates a flow diagram of another example process 900 for fall detection on uneven surfaces utilizing radar. The order in which the operations or steps are described is not intended to be construed as a limitation, and any number of the described operations may be combined in any order and/or in parallel to implement process 900.

At block 902, the process 900 may include determining, by a device over a period of time, a first set of values representing a velocity of an object moving on a surface and in a direction toward or away from the device, the surface having a gradient. For example, transmitted energy may reflect off the objects and/or walls and return to one or more receiving antennas. For example, an electronic device may include the radar receiver array, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A sensor data generator of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

A sensor data generator of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

A velocity component may be configured to utilize data representing a point cloud to determine a velocity of a given object in the environment, such as in multiple directions. For example, the velocity component may be configured to determine a velocity of a given object on the uneven surface in a first direction, also described herein as the Y direction, which may be a direction that is substantially toward and away from the device that transmits and/or receives the energy from the environment. In this example, the Y direction indicates a velocity at which the object is travelling up or down the stairs given the location of the device as being positioned, for example, at the top or the bottom of the stairs. In these examples, a person may traverse the stairs typically at a fairly constant velocity, for example at 1 meter per second. Subtle variations in the velocity may also be typical, such as when certain pauses or decreases in velocity as each step is taken when the person is climb up the stairs. Also, typically a person will travel down the stairs at a slightly faster velocity than climbing up the stairs. However, when a person is climbing up the stairs, a fall event may occur when the velocity goes from a steady rate and then decreases suddenly, such as to 0. While this may indicate a fall event, it may also simply indicate that the person has purposefully stopped climbing the stairs. As such, additional signals may be utilized to determine if this sudden drop in velocity is attributable to a fall event. When a person is traveling down the stairs, a fall event may occur when the velocity goes from a first steady rate, increases suddenly and/or changes frequently over a period of time, and then decreases to 0 or near 0. In these examples, a person traveling down the stairs may have fallen down at least a portion of the stairs, attributable to the increased velocity, and then landed at the bottom of the stairs, attributable to the 0 or near 0 velocity. Still, this velocity change may be attributable to, instead of a fall event, a person simply deciding to travel more quickly down the stairs and then stop at the bottom of the stairs purposefully. As such, additional signals may be utilized to determine if this velocity pattern is attributable to a fall event.

In addition to velocity in the Y direction, the velocity component may also determine velocity of the object in other directions, such as a second direction, also described herein as the X direction, indicating side to side motion of a person on the uneven surface. For example, when a person traverses stairs, that person may typically be positioned on a side of the stairs where a handrail is present and may stay substantially on that side of the stairs during the duration of the travel on the stairs. However, when a fall event occurs, the side to side motion of the person may differ, sometimes substantially, from how the side to side movement of the person would be absent a fall event. For example, when the velocity of the person in the X direction indicates a first minimal X direction velocity and then a sudden increase in velocity in either one direction or back and forth, such as signal may indicate that the person has fallen at least partially sideways on the stairs. By way of further example, the velocity in a third direction, also described herein as the Z direction, may be determined and may indicate a rate of change of the height of the person. In these examples, when a person traverses an uneven surface without incident, it is expected that the height will steadily or substantially steadily increase when the person is climbing up the uneven surface or decrease when the person is traveling down the uneven surface. However, when a fall event occurs, the height change may increase suddenly, indicating that the person is no longer in a standing position. Some or all of these velocities may be determined and utilized by an event component to determine if a fall event has occurred on the uneven surface of the environment. The velocity component may determine the rates-of-change of the position of the object over time utilizing, for example, the data representing the point cloud of the object as generated by the point cloud generator. In examples, a centroid of the point cloud may be determined and may be utilized as a reference position of the object over time to determine positional changes of the object.

At block 904, the process 900 may include determining, by the device over the period of time, a second set of values representing a height of the object as perceived by the device. For example, a height component may be configured to determine a height of an object over time. For example, the sensor data and/or the data representing the point cloud of the object may indicate a point of the object that has is at a maximum in the Z direction, or otherwise a top-most point of the object, also described herein as zMax. This point may represent a height of the object in the environment. The height component may determine the height of the object over time in the environment, particularly when the object traverses the uneven surface. When a person traverses the uneven surface without incident, it is expected that the height of the person will increase steadily as the person climbs the uneven surface and decrease steadily as the person travels down the uneven surface. However, when a fall event occurs, the height of the person may decrease suddenly, indicating that either the person has purposefully laid down on or near the uneven surface or the person has fallen.

At block 906, the process 900 may include determining, by the device and at a first time during the period of time, that a first value, of the first set of values, is equal to or less than at least a first threshold value indicative of the object ceasing movement. For example, the velocity component may compare the velocity values indicating the velocity of the object in the one or more directions to one or more threshold velocities to determine if a determined velocity is problematic. When one or more of the velocities satisfy one or more of the threshold velocities, the velocity component may send data to an event component indicating as much, and in examples, the data representing the velocity of the object during the subject time.

At block 908, the process 900 may include determining, by the device and at the first time, that a second value, of the second set of values, is less than a second threshold value corresponding to a location of the object at the first time. For example, the height component may be configured to compare the height values of the object with threshold height values to determine if a given height value or set of height values is potentially problematic and indicative of a fall event. In these examples, when the height component determines that the height change value satisfies the threshold height change value, the height component may send data to the event component indicating as much, and in examples, the data representing the height of the object as perceived by the device during the subject time.

At block 910, the process 900 may include determining that an event has occurred in association with the object. For example, an event component may be configured to utilize the indications from the velocity component and/or the height component and/or the data indicating the object velocity and height to determine if a fall event has occurred. For example, when the event component determines that the velocity satisfies the threshold velocity and the height value satisfies the threshold height value at or near the same time, the event component may determine that a fall event is likely to have occurred and may, in examples, determine a confidence value associated with the fall event determination. In other examples, the event component may perform the comparison of the sample values with the thresholds as described herein. It should be understood that while threshold comparisons are utilized as an example for determining if a fall event has occurred, this disclosure includes other methodologies for determining whether given sample values indicate that a fall has occurred, such as determining a score associated with given values. When the event component determines that a fall event has occurred, one or more actions may be performed, such as causing a voice interface device to output audio into the environment requesting user input confirming or denying that the event occurred and/or to establish a communication channel with another device, such as a device associated with emergency services and/or an emergency contact. Other actions are also included in this disclosure, such as sending notifications to one or more devices, sounding an alarm, dispatching emergency services, gathering additional information about the environment, etc.

Additionally, or alternatively, the process 900 may include determining, by the device, a third set of values corresponding to a lateral movement of the object over the period of time. The process 900 may also include determining that, at the first time, a third value, of the third set of values, is greater than a third threshold value. In these examples, determining that the first event has occurred may be further based on the third value.

Additionally, or alternatively, the process 900 may include determining, by the device, a third set of values associated with a rate of change of the perceived height of the object over the period of time. The process 900 may also include determining that, at the first time, a third value, of the third set of values is lower than a fourth value, wherein the fourth value indicates rate of change of the perceived height before the time. In these examples, determining that the first event has occurred may be further in response to the third value being lower than the fourth value.

Additionally, or alternatively, the process 900 may include determining, by the device over a portion of the period of time, heatmap data of energy reflected off the object, the heatmap data representing motion of the object in time and space, wherein the heatmap data includes a cluster of energy values associated with a portion of the object. The process 900 may also include determining, by the device at a second time prior to the first time, that the cluster represents a first perceived height of the portion of the object. The process 900 may also include determining, at the first time, that the cluster represents a second perceived height of portion of the object. The process 900 may also include determining that a rate of change of perceived height of the portion of the object from the second time to the first time exceeds a third threshold value. In these examples, determining that first event has occurred may be further based on the rate of change of the perceived height of the portion of the object from the second time to the first time Additionally, or alternatively, the process 900 may include determining first data indicating a position of the device with respect to the elevation gradient. The process 900 may also include determining the first threshold value based at least in part on the first data.

Additionally, or alternatively, the process 900 may include sending, by the device to a remote system, first data indicating detection of the first event and the first set of values. The process 900 may also include receiving, from the remote system, second data, the second data being based at least in part on the first data. The process 900 may also include determining the first threshold value based at least in part on the second data.

Additionally, or alternatively, the process 900 may include receiving first data indicating identifying information about one or more people in the environment. The process 900 may also include identifying, based at least in part on the first set of values, that the object is a first person from among the one or more people. The process 900 may also include determining that the first event is associated with the first person.

Figure 10:
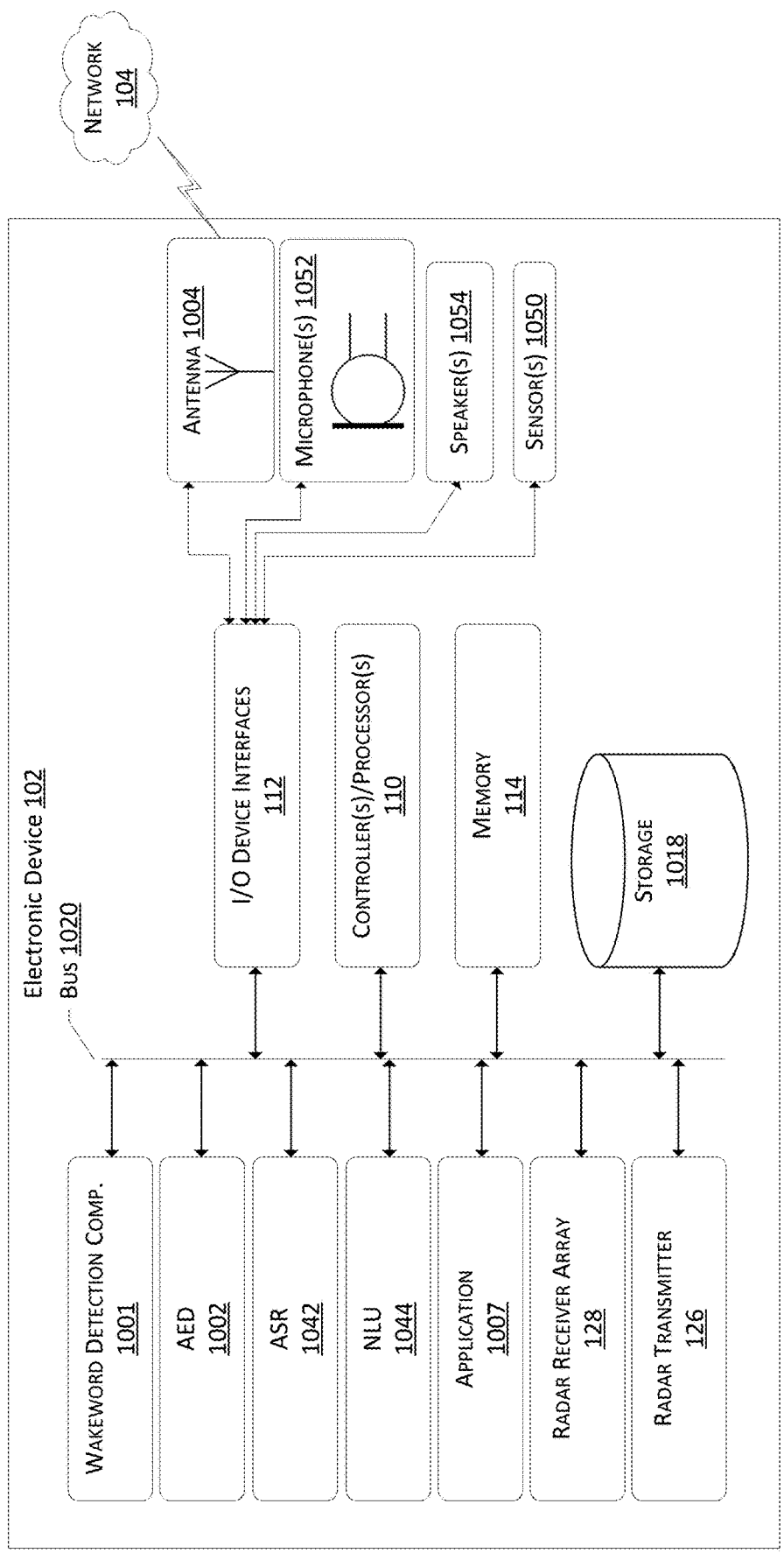
FIG. 10 illustrates a conceptual diagram of example components of an electronic device that may be utilized in association with fall detection on uneven surfaces utilizing radar.

FIG. 10 illustrates a conceptual diagram of example components of an electronic device 102 that may be utilized in association with boundary approximation. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 1052, a power source, and functionality for sending generated audio data via one or more antennas 1004 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 1052, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 10 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 1018, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 820 for conveying data among components of the respective device. Each component within a device 102 may also be directly connected to other components in addition to, or instead of, being connected to other components across the bus 1020.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 1052 or array of microphones, a wired headset or a wireless headset, etc. The microphone 1052 may be configured to capture audio. If an array of microphones is included, approximate distance to a sound's point of origin may be determined using acoustic localization based on time and amplitude differences between sounds captured by different microphones of the array. The device 102 (using microphone 1052, wakeword detection component 1001, ASR component 1042, etc.) may be configured to generate audio data corresponding to captured audio. The device 102 (using input/output device interfaces 112, antenna 1004, etc.) may also be configured to transmit the audio data to the remote system 104 for further processing or to process the data using internal components, such as a wakeword detection component 1001.

Via the antenna(s) 1004, the input/output device interface 112 may connect to one or more networks 106 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 106, the speech-processing system may be distributed across a networked environment. Accordingly, the device 102 and/or the remote system 104 may include an ASR component 1042. The ASR component 1042 of device 102 may be of limited or extended capabilities. The ASR component 1042 may include language models stored in ASR model storage component, and an ASR component 1042 that performs automatic speech recognition. If limited speech recognition is included, the ASR component 1042 may be configured to identify a limited number of words, such as keywords detected by the device, whereas extended speech recognition may be configured to recognize a much larger range of words.

The device 102 and/or the remote system 104 may include a limited or extended NLU component 1044. The NLU component 1044 of device 102 may be of limited or extended capabilities. The NLU component 1044 may comprise a name entity recognition module, an intent classification module and/or other components. The NLU component 1044 may also include a stored knowledge base and/or entity library, or those storages may be separately located.

In examples, AED 1002 may also be performed by the device 102. In these examples, the operations may include causing the AED component 1002 to be enabled or otherwise turned on, or the operations may include causing the AED component 1002 to transition from a first mode to a second mode representing a higher sensitivity to audio data generated by the microphone 1052. The AED component 1002 may utilize the audio data generated by the microphone 1052 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 1002 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 1002 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 104 may also include an application 1007 that is configured to execute commands/functions associated with a spoken command as described herein. The device 102 may include a wake word engine, which may be a separate component or may be included in an ASR component 1042. The wakeword detection component 1001 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 1054 and may utilize speaker(s) of an external or peripheral device to output audio via the speaker(s) of the external/peripheral device.

The antennas 1004 may be configured to send and receive electromagnetic waves in radio and/or microwave domains. At least one of the antennas may be configured to send and receive electromagnetic waves having a bandwidth in the ultra-wide band range, such as a bandwidth at or around 6 GHz. At least one other of the antennas may be configured to send and receive electromagnetic waves having a bandwidth in the millimeter wave range, such as a bandwidth at or around 60 GHz. It should be understood that while the examples used herein describe one antenna associated with the ultra-wide band range and one antenna associated with the millimeter band range, each or either of these antennas may include multiple antennas and/or antenna arrays. The antennas may transmit the electromagnetic waves into the environment in which the device 102 is located and may receive the electromagnetic waves back at the device 102. The distortion and/or change in the electromagnetic waves as received by the device 102 may indicate motion and/or a change in position of one or more objects within the environment. The changes in motion that may be detected may include, for example, entry and/or exit of a user from the environment, location of the user relative to the device 102, number of users in the environment, an angle at which a user is positioned relative to the device 102, a posture of a user, movement of a user within the environment, a direction of travel of a user, a size of a user, etc.

The electromagnetic waves may be received by the antennas. The corresponding sensor data may be sent to the event component, which may determine whether one or more predefined events has occurred based at least in part on the sensor data. For example, one or more models may be configured to receive the sensor data as input and determine if one or more characteristics associated with the audio data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. In these examples, the event component may analyze the sensor data with respect to reference data indicated to correspond to these and/or other events. When the event component determines that the sensor data corresponds to the reference sensor data, such as above a threshold confidence, the event component may identify, determine, and/or generate event data indicating that the predefined event has occurred. The event data may be sent from the device 102 to the remote system 104 for processing.

To assist with the detection of acoustic events, for example, the device 102 may include one or more sensors 1050 that may be configured to detect environmental changes. The sensors 1050 may include, for example, radar, audio sensors such as the microphones 1052, ultrasonic sensors, cameras, temperature sensors, motion sensors, light sensors, etc. The electronic device 102 may also include an ultrasonic component. The ultrasonic component may include functionality that allows for sound waves in the ultrasonic frequency to be emitted and received for the detection of predefined events and/or the detection of subjects in an environment.

Additionally, the electronic device 102 may include the radar transmitter 126. The radar transmitter 126 may be configured to produce and emit electromagnetic waves in the radio or microwave domain. One or more transmitting antennas of the electronic device 102 may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. Additionally, the electronic device 102 may include the radar receiver array 128, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the electronic device 102 may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
a radar transmitter;
a radar receiver array;
one or more processors; and
non-transitory computer-readable media storing computer-executable instructions that, when executed by the one or more processors, cause the one or more processors to perform operations comprising:
    causing output, by the radar transmitter, of first energy into an environment including stairs, the stairs having a uniform elevation gradient between a first boundary portion of the stairs and a second boundary portion of the stairs;
    receiving, by the radar receiver array, second energy representing the first energy as reflected by surfaces in the environment;
    determining heatmap data and sensor data corresponding to the second energy, the heatmap data representing motion of a human;
    determining, utilizing the heatmap data and the sensor data, first data representing a point cloud of the human walking up or down the stairs over a period of time;
    determining, utilizing the first data, a first velocity value of the human in a direction that is at least one of toward or away from the device over the period of time;
    determining, at a first time during the period of time, that the first velocity value decreases to at least a first threshold velocity indicative of the human ceasing walking toward or away from the device;
    determining, utilizing the sensor data at a second time prior to the first time, a first height of the human;
    determining, utilizing the sensor data at the first time, a second height of the human;
    determining, utilizing the first height and the second height, a change in a height value of the human as perceived by the device over the period of time;
    determining that, at the first time, the change in the height value indicates that a perceived height of the human is less than an expected height value with respect to a location of the human on the uniform elevation gradient;
    determining that a rate of change of perceived height of the portion of the human from the second time to the first time exceeds a rate of change threshold value; and
    in response to the first velocity value decreasing to the at least the first threshold velocity and the rate of change exceeding the rate of change threshold, determining that a fall event has occurred on the stairs.

2. The device of claim 1, the operations further comprising:
- determining, utilizing the first data, a second velocity value of a lateral motion of the human over the period of time;
- determining that, at the first time, the second velocity value increases above a second threshold velocity value indicative; and
- wherein determining that the fall event has occurred is further in response to the second velocity value increasing above the second threshold velocity value.

3. The device of claim 1, the operations further comprising:
- determining, utilizing the sensor data, a rate of change of the perceived height of the human over the period of time;
- determining that, at the first time, the rate of change indicates that the perceived height of the human decreases at a higher rate than before the first time; and
- wherein determining that the fall event has occurred is in response to the rate of change indicating that the perceived height of the human decreases at a higher rate than before the time.

4. The device of claim 1,
wherein:
- the heatmap data includes a cluster of energy values associated with a portion of the human;
- determining the first height of the human is based on the cluster representing a first perceived height of the portion of the human;
- determining the second height of the human is based on the cluster representing a second perceived height of portion of the human.

5. A method, comprising:
- determining, by a device over a period of time, a first set of values representing a velocity of an object moving on a surface and in a direction toward or away from the device, the surface having a gradient;
- determining a plurality of energy values associated with the object;
- determining, by the device and based on the plurality of energy values, a second set of values representing a height of the object during the period of time;
- determining, by the device and at a first time during the period of time, that a first value, of the first set of values, is equal to or less than at least a first threshold value indicative of the object ceasing movement;
- determining, at a second time prior to the first time, that the cluster represents a first height associated with the object;
- determining, at the first time, that the cluster represents a second height associated with the object;
- determining, by the device and at the first time, that a difference between the first height and the second height is greater than a second threshold value; and
- determining that a first event has occurred in association with the object.

6. The method of claim 5, further comprising:
- determining, by the device, a third set of values corresponding to a lateral movement of the object over the period of time;
- determining that, at the first time, a third value, of the third set of values, is greater than a third threshold value; and
- wherein determining that the first event has occurred is further based on the third value.

7. The method of claim 5, further comprising:
- determining, by the device, a third set of values associated with a rate of change of the perceived height of the object over the period of time;
- determining that, at the first time, a third value, of the third set of values is lower than a fourth value, wherein the fourth value indicates rate of change of the perceived height before the time; and
- wherein determining that the first event has occurred is further in response to the third value being lower than the fourth value.

8. The method of claim 5, wherein
the heatmap data represents motion of the object in time and space;
and wherein determining that the difference is greater than the second threshold comprise determining that a rate of change of perceived height of the portion of the object from the second time to the first time exceeds a third threshold value; and
wherein determining that first event has occurred is further based on the rate of change of the perceived height of the portion of the object from the second time to the first time.

9. The method of claim 5, wherein:
the first set of values represents a point cloud associated with the object;
determining the first value comprises determining a centroid of the point cloud;
the second value corresponds to a zMax value of the point cloud; and
determining the change in the second value comprises determining the change in the zMax value.

10. The method of claim 5, further comprising:
determining first data indicating a position of the device with respect to the elevation gradient; and
determining the first threshold value based at least in part on the first data.

11. The method of claim 5, further comprising:
sending, by the device to a remote system, first data indicating detection of the first event and the first set of values;
receiving, from the remote system, second data, the second data being based at least in part on the first data; and
determining the first threshold value based at least in part on the second data.

12. The method of claim 5, further comprising:
receiving first data indicating identifying information about one or more people in the environment;
identifying, based at least in part on the first set of values, that the object is a first person from among the one or more people; and
determining that the first event is associated with the first person.

13. A system, comprising:
one or more processors; and
non-transitory computer-readable media storing computer-executable instructions that, when executed by the one or more processors, cause the one or more processors to perform operations comprising:
- determining, over a period of time, a first set of values representing a velocity of an object moving on a surface and in a direction toward or away from the system, the surface having a gradient;
- determining a plurality of energy values associated with the object;

determining, by the device and based on the plurality of energy values, a second set of values representing a height of the object during the period of time;

determining, at a first time during the period of time, that a first value, of the first set of values, is equal to or less than at least a first threshold value indicative of the object ceasing movement;

determining, at a second time prior to the first time, that the cluster represents a first height associated with the object;

determining, at the first time, that the cluster represents a second height associated with the object;

determining, at the first time, that a difference between the first height and the second height is greater than a second threshold value; and determining that a first event has occurred in association with the object.

14. The system of claim 13, the operations further comprising:

determining a third set of values corresponding to a lateral movement of the object over the period of time;

determining that, at the first time, a third value, of the third set of values, is greater than a third threshold value; and wherein determining that the first event has occurred is further based on the third value.

15. The system of claim 13, the operations further comprising:

determining a third set of values associated with a rate of change of the perceived height of the object over the period of time;

determining that, at the first time, a third value, of the third set of values is lower than a fourth value, wherein the fourth value indicates rate of change of the perceived height before the time; and wherein determining that the first event has occurred is further in response to the third value being lower than the fourth value.

16. The system of claim 13, wherein the heatmap data represents motion of the object in time and space;

and wherein determining that the difference is greater than the second threshold comprise determining that a rate of change of perceived height of the portion of the object from the second time to the first time exceeds a third threshold value; and wherein determining that first event has occurred is further based on the rate of change of the perceived height of the portion of the object from the second time to the first time.

17. The system of claim 13, wherein:

the first set of values represents a point cloud associated with the object;

determining the first value comprises determining a centroid of the point cloud;

the second value corresponds to a zMax value of the point cloud; and determining the change in the second value comprises determining the change in the zMax value.

18. The system of claim 13, the operations further comprising:

receiving first data indicating a position of the system with respect to the elevation gradient; and determining the first threshold value based at least in part on the first data.

19. The system of claim 13, the operations further comprising:

inputting, as a feature into a machine-learning model, the first set of values and an indication that the first set of values is associated with the first event occurring;

generating, utilizing the machine-learning model and based at least in part on the feature, first data indicating a modification the first threshold value; and determining the first threshold value based at least in part on the first data.

20. The system of claim 13, the operations further comprising:

receiving first data indicating identifying information about one or more people in the environment;

identifying the object as a person of the one or more people based at least in part on the first set of values; and determining that the person is involved in the first event.

* * * * *